(12) United States Patent
Matsue

(10) Patent No.: US 10,261,190 B2
(45) Date of Patent: Apr. 16, 2019

(54) SATELLITE RADIO WAVE RECEIVING DEVICE, ELECTRONIC TIMEPIECE, POSITIONING CONTROL METHOD, AND STORAGE MEDIUM

(71) Applicant: CASIO COMPUTER CO., LTD., Tokyo (JP)

(72) Inventor: Takeshi Matsue, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/893,419

(22) Filed: Feb. 9, 2018

(65) Prior Publication Data

US 2018/0231663 A1 Aug. 16, 2018

(51) Int. Cl.
G01S 19/05 (2010.01)
G01S 19/42 (2010.01)
G04R 20/02 (2013.01)
G04R 20/06 (2013.01)

(52) U.S. Cl.
CPC .............. *G01S 19/05* (2013.01); *G01S 19/42* (2013.01); *G04R 20/02* (2013.01); *G04R 20/06* (2013.01)

(58) Field of Classification Search
CPC .......... G01S 19/00; G01S 19/01; G01S 19/05; G01S 19/13; G01S 19/42; G04R 20/02; G04R 20/06; G04R 20/12; G04R 20/18; G04R 20/24; G04R 20/30; H04B 7/2643; H04B 7/265; H04B 7/2653; H04B 7/2671; H04B 7/2675; H04B 7/2678; H04B 7/2693

USPC .............. 375/259; 342/352, 355, 356, 357.2, 342/357.21, 357.22, 357.23, 361, 362, 342/365, 385, 386; 370/310, 312–314, 370/316, 321, 337, 345, 347, 349, 350; 455/427, 440, 450, 356.1, 456.3, 464, 455/12.1, 13.2

See application file for complete search history.

(56) References Cited

U.S. PATENT DOCUMENTS

| | | | |
|---|---|---|---|
| 2002/0107031 A1* | 8/2002 | Syrjarinne .............. | G01S 19/03 455/456.1 |
| 2004/0190378 A1* | 9/2004 | Farmer ............. | H04W 56/0015 368/47 |
| 2004/0225439 A1* | 11/2004 | Gronemeyer .... | G01R 19/16542 701/469 |

(Continued)

FOREIGN PATENT DOCUMENTS

JP 2010-96672 A 4/2010

*Primary Examiner* — Young T Tse
(74) *Attorney, Agent, or Firm* — Chen Yoshimura LLP

(57) ABSTRACT

A processor of a satellite radio wave receiving device processes radio waves received by a receiver to identify a bit value in each of divided unit time segments that are obtained by dividing a time period of one bit into a plurality of unit time segments of equal duration; creates a bit array having the identified bit values in respective divided unit time segments by sequentially arranging the identified bit values in an order of receipt, the one or more processors creating said bit array in a plurality by successively shifting a time at which the bit array starts by one unit time segment; and performs a bit edge detection operation by detecting a head timing of the bit data at which a bit value changes in the received radio waves based on said plurality of bit value arrays.

20 Claims, 10 Drawing Sheets

(56) References Cited

U.S. PATENT DOCUMENTS

| | | | | |
|---|---|---|---|---|
| 2005/0226201 A1* | 10/2005 | McMillin | ................ | H04L 45/00 |
| | | | | 370/348 |
| 2008/0074950 A1* | 3/2008 | Rostrom | ................ | G01S 19/24 |
| | | | | 368/10 |
| 2017/0269558 A1* | 9/2017 | Sekitsuka | .............. | G04R 20/04 |

* cited by examiner

| Rrp | 0 | 0 | 0 | 0 | 0 | 0 | 0 | 0 | 0 | 0 | 1 | 1 | 1 | 1 | 1 | 1 | 1 | 1 | 1 | 1 |

FIG. 3

SATELLITE RADIO WAVE RECEIVING DEVICE, ELECTRONIC TIMEPIECE, POSITIONING CONTROL METHOD, AND STORAGE MEDIUM

BACKGROUND

Technical Field

The present invention relates to a satellite radio wave receiving device, an electronic timepiece, a positioning control method, and a storage medium.

Background Art

There is a technology for receiving radio waves from positioning satellites belonging to global satellite positioning systems such as the GPS (Global Positioning System), and acquiring a radio wave receiving position (current position) and date and time. In a satellite radio wave receiving device that receives radio waves from positioning satellites, the current position and an accurate date and time can be calculated based on the receiving timing of signals (navigation messages) included in transmitted radio waves from a plurality (ordinarily four or more) of positioning satellites and information pertaining to the positions of the plurality of positioning satellites.

A navigation message is transmitted by being spectrum-spread using a pseudo-noise code (PRN code) specific to each positioning satellite, in other words, by phase-modulating (BPSK) a carrier wave by means of a PRN code that has been phase-inverted according to bit values of the navigation message. In a case where a navigation message is to be demodulated and decrypted, the PRN code type and phase (head timing of a repeatedly used PRN code) are identified, and the navigation message is inverse spectrum-spread by means of the identified PRN code.

In a case where the environment in which radio waves from positioning satellites are received is poor and a sufficient strength and CN ratio cannot be obtained, there are cases where it is difficult to capture and demodulate signals and to acquire information. There is a technology for improving the receiving sensitivity (CN ratio) in such cases by receiving and superimposing an iterated code a plurality of times. One period of a PRN code, which is available to civilians and is commonly used, is shorter than the duration of each bit value. As a technology for correcting a date and time possessed and counted even in a case where the received radio waves are weak, Japanese Patent Application Laid-Open Publication No. 2010-96672 discloses that the receiving sensitivity is improved by synchronously adding received PRN codes in an appropriate manner while giving consideration to the phase inversion of the PRN codes according to each bit value of a navigation message, and that the phase (head timing) of the PRN codes and the phase (head timing) of each bit value are identified.

Meanwhile, Japanese Patent Application Laid-Open Publication No. 2010-96672 describes a known assisted positioning technology (assisted GPS or the like) for externally acquiring temporary information of positioning satellites using a separate communication unit, rather than acquiring from navigation messages, when acquiring a current position. The technology is disclosed with which the current position is promptly identified as soon as the transmission time of radio waves from a positioning satellite is acquired by retaining the position information of positioning satellites in advance in this way.

However, although accurate date and time information is essential for reliably capturing and tracking transmitted radio waves from positioning satellites and acquiring accurate position information from the beginning, there is a problem in that the acquired date and time gradually deviate as time elapses from the previous positioning. As a result, the position can no longer be obtained quickly and appropriately from the beginning, and even if obtained there is likely to be a decline in position precision.

SUMMARY OF THE INVENTION

Accordingly, the present invention is directed to a scheme that substantially obviates one or more of the problems due to limitations and disadvantages of the related art.

A satellite radio wave receiving device, an electronic timepiece, a positioning control method, and a storage medium are disclosed.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a satellite radio wave receiving device including: a receiver that receives radio waves transmitted from a satellite, the radio waves including a message signal having a sequence of bit data with each bit being assigned with a prescribed duration; and one or more processors, wherein the one or more processors perform the following: processing the radio waves received by the receiver to identify a bit value in each of divided unit time segments that are obtained by dividing a time period that has a same duration as the prescribed duration into a plurality of unit time segments of equal duration; creating a bit array having the identified bit values in the respective divided unit time segments by sequentially arranging the identified bit values in an order of receipt, the one or more processors creating the bit array in a plurality by successively shifting a time at which the bit array starts by one unit time segment; performing a bit edge detection operation by detecting a head timing of the bit data at which a bit value changes in the received radio waves based on the plurality of bit value arrays; correcting a deviation within the prescribed duration in a current date and time that is counted internally in the satellite radio wave receiving device in accordance with the detected head timing; and performing positioning by calculating a position of the satellite radio wave receiving device using the corrected current date and time.

In another aspect, the present disclosure provides a positioning control method of a satellite radio wave receiving device that includes: a receiver that receives transmitted radio waves transmitted from a satellite, the radio waves including a message signal having a sequence of bit data with each bit being assigned with a prescribed duration; and one or more processors, the method being performed by the one or more processors and including: processing the radio waves received by the receiver to identify a bit value in each of divided unit time segments that are obtained by dividing a time period that has a same duration as the prescribed duration into a plurality of unit time segments of equal duration; creating a bit array having the identified bit values in the respective divided unit time segments by sequentially arranging the identified bit values in an order of receipt, the one or more processors creating the bit array in a plurality by successively shifting a time at which the bit array starts by one unit time segment; performing a bit edge detection operation by detecting a head timing of the bit data at which a bit value changes in the received radio waves based on the plurality of bit value arrays; correcting a deviation within the prescribed duration in a current date and time that is counted internally in the satellite radio wave receiving device in accordance with the detected head timing; and performing positioning by calculating a position of the satellite radio wave receiving device using the corrected current date and time.

In another aspect, the present disclosure provides a computer-readable non-transitory storage medium having stored thereon a program that causes the one or more processors in a satellite radio wave receiving device that includes a receiver that receives transmitted radio waves transmitted from a satellite, the radio waves including a message signal having a sequence of bit data with each bit being assigned with a prescribed duration; and the one or more processors to perform the following: processing the radio waves received by the receiver to identify a bit value in each of divided unit time segments that are obtained by dividing a time period that has a same duration as the prescribed duration into a plurality of unit time segments of equal duration; creating a bit array having the identified bit values in the respective divided unit time segments by sequentially arranging the identified bit values in an order of receipt, the one or more processors creating the bit array in a plurality by successively shifting a time at which the bit array starts by one unit time segment; performing a bit edge detection operation by detecting a head timing of the bit data at which a bit value changes in the received radio waves based on the plurality of bit value arrays; correcting a deviation within the prescribed duration in a current date and time that is counted internally in the satellite radio wave receiving device in accordance with the detected head timing; and performing positioning by calculating a position of the satellite radio wave receiving device using the corrected current date and time.

It is to be understood that both the foregoing general description and the following detailed description are exemplary and explanatory, and are intended to provide further explanation of the invention as claimed.

BRIEF DESCRIPTION OF THE DRAWINGS

FIG. 3 is a drawing showing a comparison bit value array that is used when bit synchronization is to be carried out.

DETAILED DESCRIPTION OF EMBODIMENTS

Hereinafter, embodiments will be described based on the drawings.

Figure 1:
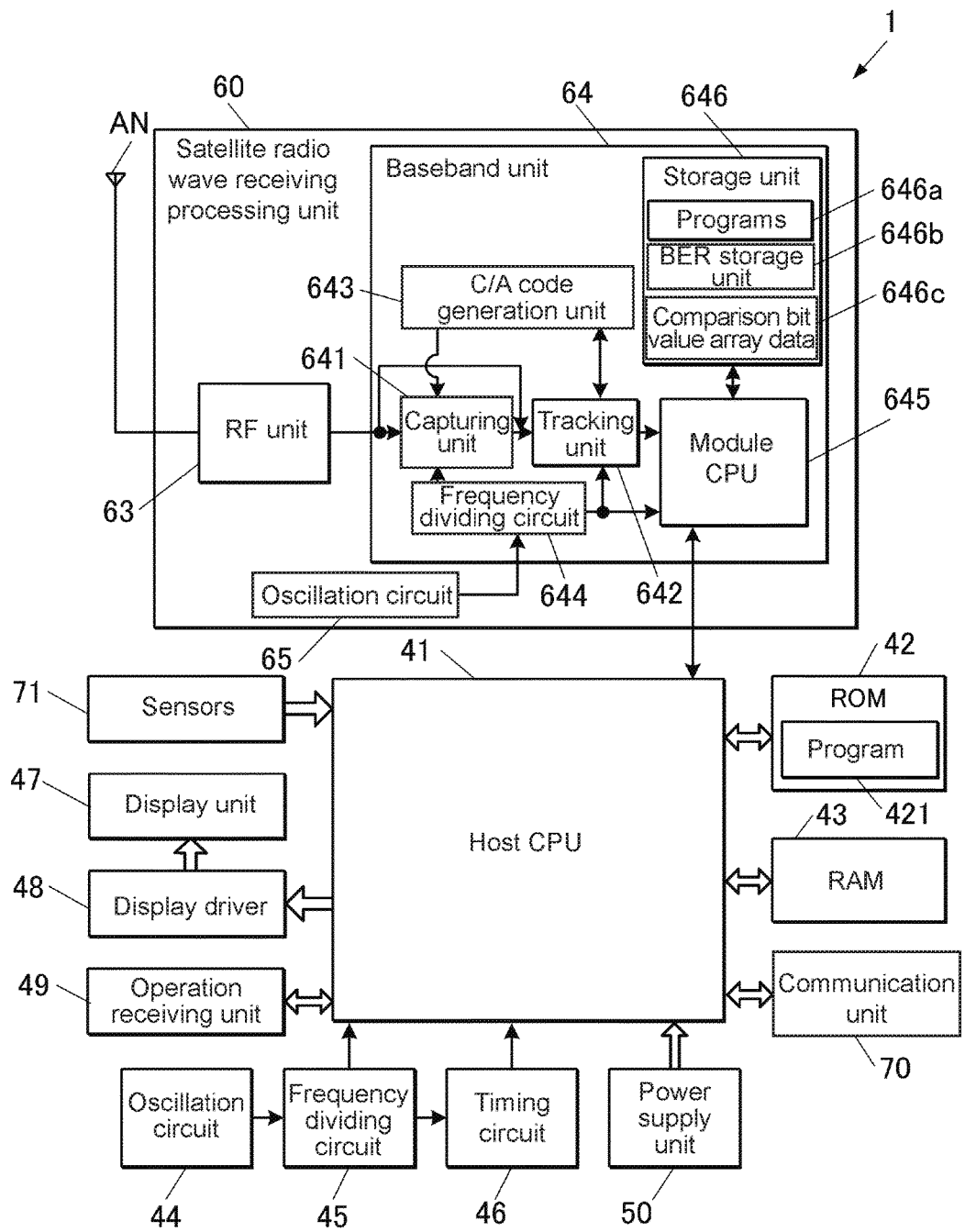
FIG. 1 is a block diagram showing a functional configuration of an electronic timepiece of an embodiment of the present invention.

FIG. 1 is a block diagram showing a functional configuration of an electronic timepiece 1 of the present embodiment.

This electronic timepiece 1 is a timepiece that is capable of receiving radio waves from positioning satellites (satellites), at least positioning satellites belonging to the GPS (Global Positioning System) of the United States of America (hereinafter, referred to as GPS satellites), demodulating signals, and acquiring date and time information.

The electronic timepiece 1 is provided with a host CPU 41 (central processing unit) (display control unit), a ROM 42 (read only memory), a RAM 43 (random access memory), an oscillation circuit 44, a frequency dividing circuit 45, a timing circuit 46 (an external timing unit or a counter), a display 47, a display driver 48, an operation receiving unit 49, a power supply unit 50, a satellite radio wave receiving processing unit 60 serving as a satellite radio wave receiving device, an antenna AN, a communication unit 70, sensors 71, and the like.

The host CPU 41 carries out various types of computational processing, and integrally controls the overall operation of the electronic timepiece 1. The host CPU 41 reads control programs from the ROM 42 and loads the control programs into the RAM 43 to carry out various types of operation processing such as display of the date and time and computational control and display pertaining to various types of functions. Furthermore, the host CPU 41 causes the satellite radio wave receiving processing unit 60 to operate and receive radio waves from positioning satellites, and acquires date and time information and position information obtained based on the content received by the satellite radio wave receiving processing unit 60.

The ROM 42 is a mask ROM, a rewritable nonvolatile memory, or the like, and stores control programs and initial setting data. The control programs include a program 421 pertaining to the control of various types of processing for acquiring various types of information from positioning satellites.

The RAM 43 is a volatile memory such as an SRAM or a DRAM, and stores various types of setting data as well as providing the host CPU 41 with a memory space for operation and storing temporary data. The various types of setting data include a local time setting pertaining to counting and displaying the date and time in the electronic timepiece 1, in other words, a home city setting pertaining to a time zone, and a setting pertaining to whether or not daylight-saving time is to be applied. Furthermore, in a case where data (ephemeris data) including the precise orbit information of a positioning satellite is externally acquired via the communication unit 70, the ephemeris data is stored in the RAM 43 and copied or moved to a storage unit 646 of the satellite radio wave receiving processing unit 60 at an appropriate timing. A part or all of the various types of setting data stored in the RAM 43 may be stored in a nonvolatile memory.

The oscillation circuit 44 generates and outputs a prescribed frequency signal that is determined in advance. A crystal oscillator, for example, is used in this oscillation circuit 44.

The frequency dividing circuit 45 divides the frequency signal that is input from the oscillation circuit 44 into a signal having the frequency of a clock signal used by the timing circuit 46 and the host CPU 41 and outputs the divided signal. It may be possible for the frequency of this output signal to be changed based on a setting implemented by the host CPU 41.

The timing circuit 46 counts the current date and time by counting the number of inputs of the prescribed frequency signal (clock signal) that is input from the frequency dividing circuit 45, and adding the number of inputs to an initial value. The timing circuit 46 may be an element that changes values stored in the RAM in a software-like manner, or may be provided with a dedicated counter circuit. The date and time counted by the timing circuit 46 are not particularly restricted; however, for example, any of a cumulative time from a prescribed timing, the UTC date and time (Coordinated Universal Time), the date and time of a home city (local time) that is set in advance, or the like can be used. Furthermore, the date and time itself counted by this timing circuit 46 does not necessarily have to be retained in the format of year-month-day and hour-minute-second. The clock signal that is input to the timing circuit 46 from the frequency dividing circuit 45 can include a slight deviation from the accurate elapsed time. The magnitude of a deviation (rate, proportion of deviation) per one day in the date and time counted by the timing circuit 46 changes according to the operating environment, for example, the temperature, but is ordinarily within ±0.5 seconds.

The aforementioned host CPU 41, the ROM 42, the RAM 43, the oscillation circuit 44, the frequency dividing circuit 45, and the timing circuit 46 can be formed on a single IC substrate as a microcomputer. The crystal oscillator used for the oscillation circuit 44 may be externally attached.

The display 47 is provided with a display screen such as a liquid crystal display (LCD) or an organic EL (electroluminescent) display, and digitally carries out the display of at least the time based on the date and time counted by the timing circuit 46 and the display pertaining to various types of functions by means of either of a dot matrix scheme and a segment scheme or a combination thereof.

The display driver 48 outputs a drive signal corresponding to the type of display screen to the display 47 on the basis of a control signal from the host CPU 41 to be displayed on the display screen.

Alternatively, the display 47 and the display driver 48 may include, in addition to or instead of a digital display screen, a needle and a stepping motor for rotationally operating the needle, a driving circuit that outputs a drive signal to the stepping motor, and the like.

The operation receiving unit 49 receives an input operation from a user, and outputs an electrical signal corresponding to the input operation to the host CPU 41 as an input signal. This operation receiving unit 49 includes a pushbutton switch and a crown switch, for example.

Alternatively, the display 47 and the operation receiving unit 49 may be provided in an integral manner by providing a touch sensor superimposed on the display screen of the display 47, and causing the display screen to function as a touch panel that outputs an operation signal corresponding to the detection of a contact position and contact state pertaining to a contact operation carried out by the user via the touch sensor.

The communication unit 70 executes and controls communication operations with external electronic devices on the basis of the control carried out by the host CPU 41. Here, the communication unit 70 controls wireless communication operations carried out by means of Bluetooth (registered trademark), for example. As Bluetooth communication, the high-speed communication of version 3 is possible, and the low-energy communication of version 4 may be possible. Alternatively, the communication unit 70 may be capable of communication by means of a wireless LAN or the like, and may be provided with a connection terminal so as to be capable of wired communication with an external electronic device via a communication cable.

The sensors 71 measure physical quantities pertaining to the motion state of the electronic timepiece 1 (the device itself) and output measurement values to the host CPU 41. The sensors 71 include an acceleration sensor and a direction sensor, for example. The host CPU 41 can calculate movement distances and movement directions within a prescribed time by continuously acquiring these measurement values and integrating the movement directions and movement amounts of the electronic timepiece 1 (the user thereof) (autonomous navigation). Various technologies are known with regard to methods for calculating the amount of movement in a case where a specific acceleration fluctuation pattern such as that produced when walking is measured, and any or a plurality thereof can be combined and used. Furthermore, it may be possible to measure motion (movement direction and movement amount) in the altitude direction by including an air pressure sensor in the sensors 71 and retaining a table that indicates correlations between air pressure and altitude in the ROM 42 or the like.

The power supply unit 50 supplies power that is output from a battery, to each unit at a prescribed voltage. Here, a solar panel and a secondary cell are used as a battery for the power supply unit 50. The solar panel generates an electromotive force from incident light to supply power to each unit such as the host CPU 41, and, in a case where surplus power has been generated, stores this power in the secondary cell. However, in a case where the power that can be generated from the amount of incident light from outside to the solar panel is insufficient with respect to the power consumption, power is supplied from the secondary cell to each unit. A primary cell such as an externally detachable button-type dry cell may be used as the battery.

The satellite radio wave receiving processing unit 60 synchronizes with and receives radio waves transmitted from positioning satellites via the antenna AN. The satellite radio wave receiving processing unit 60 identifies a pseudo-noise code (C/A code), with which a navigation message (message signal) included in the transmitted radio waves received is spectrum-spread, and the phase of the pseudo-noise code, and captures a navigation message signal. The satellite radio wave receiving processing unit 60 demodulates the captured navigation message, identifies a code string (each bit) to carry out necessary processing, and acquires desired information. The satellite radio wave receiving processing unit 60 is provided with an RF unit 63, a baseband unit 64, an oscillation circuit 65, and the like.

The RF unit 63 selects and amplifies a desired frequency signal from received radio waves (RF signal), converts the desired frequency signal into a signal of an intermediate frequency band (IF signal), and then digitally converts the IF signal by means of a prescribed sampling frequency and outputs the converted IF signal to the baseband unit 64.

The baseband unit 64 processes IF signal data that has been converted into digital discrete values, to acquire and calculate desired information. The baseband unit 64 is provided with a capturing unit 641, a tracking unit 642, a C/A code generation unit 643, a frequency dividing circuit 644, a module CPU 645 (a processor or a computer), the storage unit 646, and the like.

The module CPU 645 is a processor that controls the operation of the satellite radio wave receiving processing unit 60 in accordance with the input of control signals from the host CPU 41 and setting data. The module CPU 645 reads a necessary program and setting data from the storage unit 646, causes each unit of the RF unit 63 and the baseband unit 64 to operate, and receives and demodulates (inverse spectrum-spreading and identification of each bit) transmitted radio waves received from each positioning satellite to acquire date and time information and position information. This module CPU 645 acquires desired information from the demodulated signals. The module CPU 645 may decrypt the desired information by decoding a demodulated navigation message signal in accordance with a preset navigation message format. Received content and the timing thereof can be identified, without directly decrypting a code string, by comparing/collating and detecting matches between a bit array for comparing/collating that has been set in advance in accordance with the navigation message format, and a bit array for the demodulated signal.

Furthermore, the module CPU 645 counts the date and time using a clock signal of a prescribed frequency that is input from the frequency dividing circuit 644. In a case where the module CPU 645 does not have data regarding the current date and time, the module CPU 645 counts the date and time using, as initial data, the counted date and time of the timing circuit 46 that is input from the host CPU 41, or the date and time counted by an RTC (real time clock), which is not shown, provided in the satellite radio wave receiving processing unit 60.

The storage unit 646 has various types of nonvolatile memories such as a flash memory and an EEPROM (electrically erasable and programmable read only memory), and a RAM. The nonvolatile memory of the storage unit 646 stores various types of programs 646a pertaining to positioning and acquiring date and time information, setting data, and positioning and date and time information acquisition history. The data stored in the nonvolatile memory includes precise orbit information of each positioning satellite (ephemeris), predicted orbit information (almanac), dates and times and positions of previous positioning, a BER storage unit 646b (bit error rate) that is used for a test pertaining to identifying bit values, and comparison bit value array data 646c that includes a comparison bit value array Rrp that is used for detecting a bit edge. Here, the BER storage unit 646b stores data regarding bit error rates (correlations between receiving strengths and bit error rates) respectively associated with a plurality of levels of receiving strengths of satellite radio waves. The programs 646a include a program that constitutes a program of an embodiment of the present invention and executes positioning control processing (including bit synchronization control processing), which will be described later on. Furthermore, the RAM provides the module CPU 645 in the satellite radio wave receiving processing unit 60 with a memory space for operation and stores various types of temporary data.

The capturing unit 641 identifies the types of positioning satellites from which the radio wave is received, in other words, C/A codes and the phases of the C/A codes, by calculating respective correlation values with C/A codes in each phase for each positioning satellite with respect to the digital discrete values of the IF signal that is input from the RF unit 63, and detecting a peak in the correlation values. In this capturing operation, for example, a matched filter is used, and correlation values are calculated in a simultaneous and parallel manner with respect to the C/A codes of a plurality of positioning satellites.

The tracking unit 642 maintains the C/A codes of the identified positioning satellites and the phases thereof, and continuously acquires navigation message signals transmitted from the positioning satellites. The tracking unit 642 acquires difference information between the phases of the C/A codes in the signals being tracked and the phases of the C/A codes input from the C/A code generation unit 643 and carries out feedback, and inverse spectrum-spreads and demodulates IF signals while finely adjusting phase deviations to identify each bit value. A plurality of configurations of the tracking unit 642 are provided in parallel in accordance with the number of positioning satellites that can be processed in parallel.

The C/A code generation unit 643 retains, in advance, chip array information of the C/A codes of all of the positioning satellites that can be targets for receiving, and sequentially generates the C/A codes of positioning satellites that are candidates for receiving or identified positioning satellites and selectively outputs the C/A codes to either of the capturing unit 641 and the tracking unit 642 at an appropriate speed. The C/A codes of positioning satellites that have not been captured may be output to the capturing unit 641 while outputting the C/A codes of captured positioning satellites to the tracking unit 642. The C/A code generation unit 643 is able to simultaneously generate C/A codes pertaining to a plurality of positioning satellites and output the C/A codes in parallel to the capturing unit 641 and the tracking unit 642. Furthermore, the phases of the C/A codes that are output to the tracking unit 642 can be changed according to a control signal from the tracking unit 642, as described later on.

The frequency dividing circuit 644 divides a signal of a prescribed frequency that is input from the oscillation circuit 65 and supplies a prescribed clock signal to each unit of the baseband unit 64. The clock signal generated by the frequency dividing circuit 644 is set to a frequency according to a processing speed that corresponds to the input speed and output speed of data, such as that of the processing of the IF signal that is input to the tracking unit 642, for example.

Each unit of the baseband unit 64, particularly the capturing unit 641 and the tracking unit 642, carry out processing efficiently due to being provided with dedicated hardware configurations (processors); however, a CPU serving as a processor may carry out some or all of the function operations of each unit in accordance with software control.

The oscillation circuit 65 generates a signal of a prescribed frequency and outputs the signal to the RF unit 63 and the baseband unit 64. The output frequency of this oscillation circuit 65 is, for example, 16 MHz to 32 MHz or the like, and an element having higher precision than that of the oscillation circuit 44 is used, such as a TCXO (temperature compensated crystal oscillator), for example, although this is not particularly restricted.

This satellite radio wave receiving processing unit 60 is supplied with power directly from the power supply unit 50, and the on/off thereof and the stopping (sleep) of only the receiving operation are switched according to control signals of the host CPU 41. In other words, outside of periods in which the receiving of radio waves from positioning satellites and calculation operations pertaining to acquiring the date and time and positioning are being carried out, the power supply for the satellite radio wave receiving processing unit 60 is interrupted separately from the host CPU 41 and the like that are operating all the time.

From thereamong, at least the RF unit 63 and the capturing unit 641 and the tracking unit 642 of the baseband unit 64 make up a receiver that receives transmitted radio waves including navigation messages from the positioning satellites in the electronic timepiece 1 of the present embodiment.

Next, the transmitted radio waves from positioning satellites will be described.

As mentioned above, a positioning satellite generates a message signal (navigation message) expressing information pertaining to the date and time, the position and state of the positioning satellite, and the like from a plurality of items of bit data (code string) arranged in a prescribed format. An array of bit data that forms this navigation message is spectrum-spread by means of exclusive OR with each chip of a C/A code that is determined in advance for each positioning satellite, and a carrier wave signal is phase-modulated (BPSK) by means of this spectrum-spread signal to be output (emitted) and transmitted as transmitted radio waves. In other words, the transmitted radio waves from the positioning satellite include a carrier wave, a C/A code that is an array of chips, and a navigation message that is composed of an array of bit data.

Figure 2:
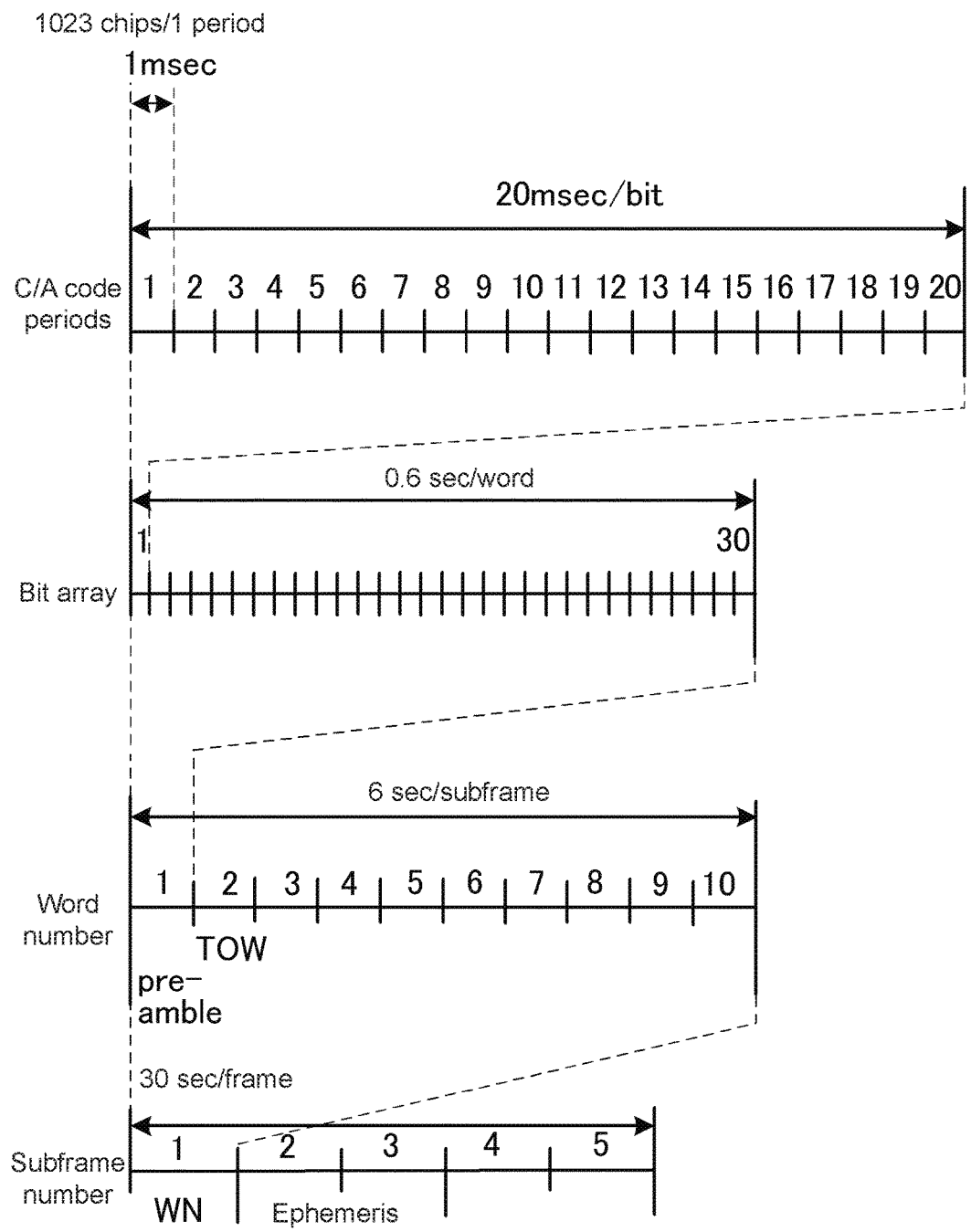
FIG. 2 is a drawing illustrating the format of a navigation message in a GPS satellite.

FIG. 2 is a drawing illustrating the format of a navigation message in a GPS satellite.

In a GPS satellite, a navigation message is output at 50 bps (the duration per bit is 20 msec). A C/A code has a 1-msec period and is consequently repeated for 20 periods during the length (time length) of 1 item of bit data. This navigation message includes a portion for date and time information (TOW; time of week) expressed by means of a 17-bit code in the second word of each subframe, with 30 bits for 0.6 seconds serving as one word, and 300 bits for 6 seconds serving as one unit (subframe). Furthermore, this navigation message includes precise orbit information (ephemeris; subframes 2 and 3) of the positioning satellite for every 30 seconds (5 subframes, 1 frame), and remaining date and time information (WN; week number, subframe 1).

Each subframe always starts with a fixed 8-bit code (preamble). Furthermore, each subframe includes a code indicating a subframe number (subframe ID). In a case where a navigation message is to be decoded and decrypted, first, this preamble is detected for the position of the preamble to serve as a reference.

In a case where the electronic timepiece 1 retains a rough date and time and it is possible to specify the WN (date) without receiving and decrypting the WN, complete date and time information can be acquired by only the TOW in any subframe being received and decrypted. Furthermore, in a case where an assumed deviation in the rough date and time is sufficiently small and it is possible to identify the subframes, in other words, in a case where an error in the rough date and time is less than 6 seconds (less than ±3 seconds if there is no limit in the deviation direction), the date and time can be specified merely by the preamble being identified. In addition, in a case where the electronic timepiece 1 retains a date and time that is almost accurate and it is possible to specify the bit data within the navigation message, in other words, in a case where an error in the date and time is less than 20 msec (less than ±10 msec if there is no limit in the deviation direction), and a rough distance between the positioning satellite received and the current position is sufficiently small, in other words, the transmission time of radio waves, is already known within an error range that is sufficiently small compared to 20 msec, and, as long as a bit head timing has been identified, it is possible to correct a deviation in the date and time in accordance with the amount of deviation in this head timing without the necessity of identifying a bit array including the preamble and decrypting a code string. By reducing the amount of information that needs to be received and acquired in this way, the receiving time for information necessary for calculating the date and time can be reduced and the processing amount can be reduced.

In a case where a TCXO is used in the oscillation circuit 65 and temperature changes or the like are within an ordinary usage range, a counting error (proportion of deviation) in the date and time is 1 ppm or less. Consequently, the time to a deviation of ±10 msec being produced is of the order of $10^4$ sec (2 hours 46 minutes) at the shortest. In a case where the power supply to the satellite radio wave receiving processing unit 60 (module CPU 645) has been turned off prior to positioning being started or restarted, during this time the operation of the module CPU 645 is stopped (interrupted) and the date and time information is not counted, and therefore, as mentioned above, date and time information (initial values) is acquired from the host CPU 41 or the RTC and counting of the date and time is started. In this case, a counting error (proportion of deviation) in the date and time of the timing circuit 46 or the RTC that counts the date and time independently from the counting of the date and time by the module CPU 645 is of the order of 10 ppm or less (in other words, a counting error in the date and time using the TCXO is smaller than a counting error in the date and time produced by the timing circuit 46), and therefore the time to a deviation of ±10 msec being produced is of the order of $10^3$ sec (16 minutes 40 seconds) at the shortest. In a case where a time period during which the date and time are being counted by the module CPU 645 (a period during which operation of the module CPU 645 is continued) and a time period during which the date and time are not being counted by the module CPU 645 (a period during which operation of the module CPU 645 is interrupted) are both present, according to the combination thereof, the shortest time to a deviation of ±10 msec being produced is from 103 sec to 104 sec. Information pertaining to operation periods and receiving periods of the satellite radio wave receiving processing unit 60 is stored in the RAM 43 as receiving history.

Next, a radio wave receiving operation in the electronic timepiece 1 of the present embodiment will be described.

In the electronic timepiece 1, continuous positioning in which positioning is carried out continuously, intermittent positioning in which positioning is carried out intermittently at prescribed time intervals and movement history is acquired, and independent positioning in which positioning is carried out only once and then terminated are possible. In continuous positioning, and intermittent positioning and independent positioning in which the time intervals during positioning are short (intervals of the order of several seconds to several minutes, for example), an ephemeris acquired once can be continuously used over a plurality of times of positionings. Furthermore, in a case where a prescribed data server is accessible via the communication unit 70, an ephemeris that has been acquired from the external data server can be used without receiving an ephemeris from a positioning satellite.

When performing positioning, three components of position coordinates for the current position and four components of a deviation in the current date and time are obtained based on the position coordinates and a deviation time in the receiving timing of signals of four or more positioning satellites, and on the current date and time. These calculations are ordinarily carried out by numerically converging from a prescribed initial value (by means of the Newton-Raphson method, for example), and therefore a correct result can be easily obtained in a shorter time and a more reliable manner the closer the setting for the initial value is to the converged value. Furthermore, the precision of an obtained position is dependent on the decision precision for the receiving timing of the transmitted radio waves from the plurality of positioning satellites. In the electronic timepiece 1, ordinarily, by carrying out C/A code phase synchronization, it is possible to decide a deviation in the radio wave receiving timing from a plurality of satellites at a precision of the order of slightly less than 1 chip per 1 μsec.

Ordinarily, zero is set as the initial value for the amount of deviation in the date and time. In a case where the elapsed time from the previous positioning and correction of the date and time carried out by the module CPU 645 is sufficiently small, for example, of the order of 10 seconds to several minutes, there is no large change in any of the deviations in the position coordinates of each positioning satellite, the current position of the electronic timepiece 1, and the counted date and time, and therefore the change in the deviation in the receiving timing (transmission time) of transmitted radio waves from the positioning satellites is also very small, in other words, the change is only of the order of a C/A code transmission period (1 msec) or less. Consequently, in a case where intermittent positioning is carried out at this kind of frequency, as long as the phases of C/A code periods are decided without decrypting code strings of navigation messages and furthermore without determining bit data boundary timings (bit edges) (bit synchronization and bit edge detection operations), the very small change can be accurately identified based on a deviation time in the previous receiving timing of transmitted radio waves from a positioning satellite, and deviations in the current position and counted date and time can be identified more easily and in a shorter time.

However, a deviation in the counted date and time that can be produced based on the aforementioned counting error in the date and time can become larger in accordance with the elapsed time from when the date and time has been corrected, and a change in the positional relationship between a positioning satellite and the current position can also become larger in accordance with the elapsed time from when positioning and correction of the deviation in the counted date and time have been previously carried out. As a result, a deviation time in the radio wave receiving timing from a positioning satellite can differ more greatly than the length (1 msec) of a C/A code transmission period compared to the previous deviation time, and, in addition, bit data that is actually received and identified can differ from bit data that is assumed from the counted date and time.

In the electronic timepiece 1 of the present embodiment, a maximum error in the counted date and time is estimated based on the elapsed time since the previous positioning and correction of the counted date and time, the operating state of the satellite radio wave receiving processing unit 60, and the like. Also, in accordance with this maximum error, it is determined whether only the synchronization timing within a C/A code period is to be acquired, whether it is necessary to decide bit data boundary timings (carry out bit synchronization), or furthermore whether it is necessary to identify code positions such as the preamble.

As the elapsed time since a correction of the counted date and time increases, there are cases where the positioning satellite moves and the time deviation (transmission time) in the radio wave receiving timing changes 1 msec or more even if the deviation in the counted date and time remains small, and therefore the simple elapsed time may be taken into consideration as well as the maximum error in the counted date and time with regard to whether or not bit synchronization is to be carried out. Furthermore, the transmission time of transmitted radio waves from each positioning satellite may be calculated once again on the basis of an accurate date and time obtained during positioning, and whether or not the value of a digit of 1 msec or more changes may be determined each time or at prescribed intervals.

Next, an operation pertaining to bit synchronization will be described.

Figure 3:
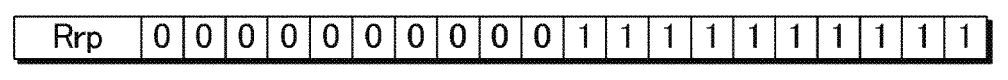

FIG. 3 is a drawing showing a comparison bit value array Rrp that is used when bit synchronization is to be carried out.

In the electronic timepiece 1, when phase synchronization with C/A codes is carried out, the bit values of a navigation message signal are identified in synchronization with each period for each length (1-msec long; a divided period) of one C/A code period, and an identified bit value array in which the identified bit values are arranged in receiving order is acquired (generated). As mentioned above, the length of 1 bit is 20 C/A code periods, and therefore, in other words, the length of one C/A code period (a divided period) is a length obtained by dividing the duration of 1 bit (20-msec long) into a plurality. Thus, identified bit values may change every 20 periods. Consequently, in one from among 20 types of arrays (array portions) of bit values composed of 20 (a prescribed number equal to or greater than 2; here, equal to the number of C/A code periods within the duration of 1 bit) continuous bit values obtained by shifting a head position from among the bit values of the identified bit value array one at a time (in other words, 1 msec at a time) for at most 19 bit values (20 msec; in other words, for a number corresponding to the duration of 1 bit), bit values are different between the $10^{th}$ bit value and prior thereto and the $11^{th}$ bit value and subsequent thereto while having a boundary (boundary position) between the $10^{th}$ and the $11^{th}$ bit values. In other words, this array portion is either a complete match (bit value 1=1 or 0=0) or a complete mismatch (bit value 1 ≠0 or 0≠1) with the array pattern of bit values that are different from each other (in other words, "0" and "1") before and after the boundary position determined in advance, as in the comparison bit value array Rrp (collation bit value array) of FIG. 3. Furthermore, the number of bit values that do not match (are not a mismatch) increases one at a time for each shift forwards and backwards one at a time (1 msec at a time from the head timing) from a head position at which the head position of the array portion constitutes this complete match or complete mismatch.

There are cases where the identified bit values do not switch (1→1 and 0→0) midway in an identified bit value array that has been obtained in a period in which the same bit value is being continuously transmitted in a navigation message, and therefore there is no change in the number of matches and the number of mismatches among the 20 types of array portions. This kind of situation is determined by the number of matching bit values between the comparison bit value array Rrp and each array portion becoming always half of the entirety thereof (10 bit values from among 20 bit values always). In this case, the same processing is once again carried out in a period 20 msec or 40 msec that occurs after the period of the previously identified bit value array acquired.

However, the frequency of making an error in the identification (misidentification) of bit values gradually increases as the receiving strength of radio waves from a positioning satellite declines. In the electronic timepiece 1 of the present embodiment, processing is respectively carried out in which 20 bit values in 20 types of array portions obtained from an identified bit value array are each compared (collated) with the 20 bit values of the comparison bit value array Rrp, and a bit data boundary timing (bit edge) is decided as being the timing of a head (position corresponding to the boundary position in the comparison bit value array Rrp) at which data of the $11^{th}$ bit value of the array portion corresponding to an array portion considered to probabilistically have the largest degree of matching or mismatching with the comparison bit value array Rrp at a prescribed precision has been acquired. The 20 types of array portions may be prepared and compared with the comparison bit value array Rrp in parallel. Here, this comparison bit value array Rrp is included in the comparison bit value array data 646c and stored and retained in the storage unit 646, and is read and used as necessary. Alternatively, the baseband unit 64 may have a hardware configuration with which processing similar to the collation against the comparison bit value array Rrp is possible (for example, outputting the 10 bits of the first half of the array portion to be compared as they are, and inverting and outputting the 10 bits of the latter half, and add them).

Here, the array portion having the largest out of the number of matches and the number of mismatches and the array portion having the second largest out of the number of matches and the number of mismatches among the 20 types of array portions and the comparison bit value array Rrp are extracted, and whether or not it is possible to decide the bit data boundary timing is determined according to whether or not there is a sufficiently low probability of mistaking and misrecognizing (whether misrecognition will not occur at a prescribed probability or higher) the array portion corresponding to an array portion having the aforementioned largest out of the number of matches and the number of mismatches (a first array portion) and the array portion corresponding to an array portion having the second largest out of the number of matches and the number of mismatches (a second array portion, in other words, another array portion). A probability P of misidentifying any m number of bit values from among N number of bit values is expressed, using a bit error rate $\varepsilon$, as $P=(1-\varepsilon)^{N-m} \varepsilon^m {}_N C_m$. The bit error rate $\varepsilon$ changes based on the receiving strength (CN ratio and the like) but is obtained as an example here as $P={}_N C_m/2^N$ with simply $\varepsilon=0.5$. These computation results may be stored and retained in advance in association with N and m and may be referred to and acquired as necessary, or may be simply calculated using an approximation. Furthermore, the value of $2^N$ is canceled out when a ratio is calculated, and therefore may not be calculated from the beginning.

In the electronic timepiece 1, out of the number of matches (20−m) (degree of matching) and the number of mismatches m (degree of mismatching) in 20 bit values pertaining to the comparison and collation for each array portion, the larger is set as the number of matches and the smaller as the number of mismatches (degree of mismatching). In other words, the number of matches is taken as F=|20−2×m|, and the number of mismatches is correspondingly obtained as E=(20−F)/2.

As mentioned above, the number of mismatches E for an array portion in which the position of the bit value switching boundary matches the comparison bit value array Rrp is 0, and this number of mismatches E, as it is, is the number of misidentified bit values. Consequently, if a ratio Pd=P1/P2 of a probability P1 of the smallest number m1 of misidentifications (detection probability of an array portion having m1 number of misidentifications) with respect to a probability P2 of the second smallest number m2 of misidentifications (detection probability of an array portion having m2 number of misidentifications) is equal to or less than a prescribed reference ratio, for example, equal to or less than $10^{-7}$, it is determined that the array portion having the smallest m1 number of misidentifications matches (or mismatches) to the greatest extent with the comparison bit value array Rrp at a sufficient precision, and the bit data boundary timing is decided. In a case where the receiving strength (CN ratio) is low and misidentifications increase and a sufficient precision cannot be obtained in one attempt (when equal to or less than the reference ratio), a plurality of periods can be integrated to increase precision until the ratio Pd is equal to or less than the reference ratio. As mentioned above, the larger out of the number of matches and the number of mismatches is automatically treated as the number of matches F, and therefore, by integrating this number of matches F, it is not necessary to give consideration to the direction in which bit values change between "0" and "1". It should be noted that the ratio Pd may be simply and directly calculated using an approximation or the like, rather than calculating the ratios P1 and P2 separately and then calculating the ratio Pd.

In a period in which the same bit value is continuously transmitted in a navigation message, there is no considerable difference between the number of matches and the number of mismatches for the largest out of the number of matches and the number of mismatches even if a few misidentifications are included, and therefore, in a case where this difference is equal to or less than a prescribed reference difference, for example, 10 or less (in other words, both the number of matches and the number of mismatches are 5 or more and 15 or less), it is determined that the same bit value is being continuously transmitted and the comparison result (collation result) can be abandoned without carrying out the processing thereafter pertaining to deciding the bit data boundary timing (without deciding a bit edge). Furthermore, it is thereby possible to precisely detect bit edges by excluding the data of periods in which receiving sensitivity has temporarily declined (CN ratio has deteriorated) to the extent that code identification has become difficult.

Figure 4:
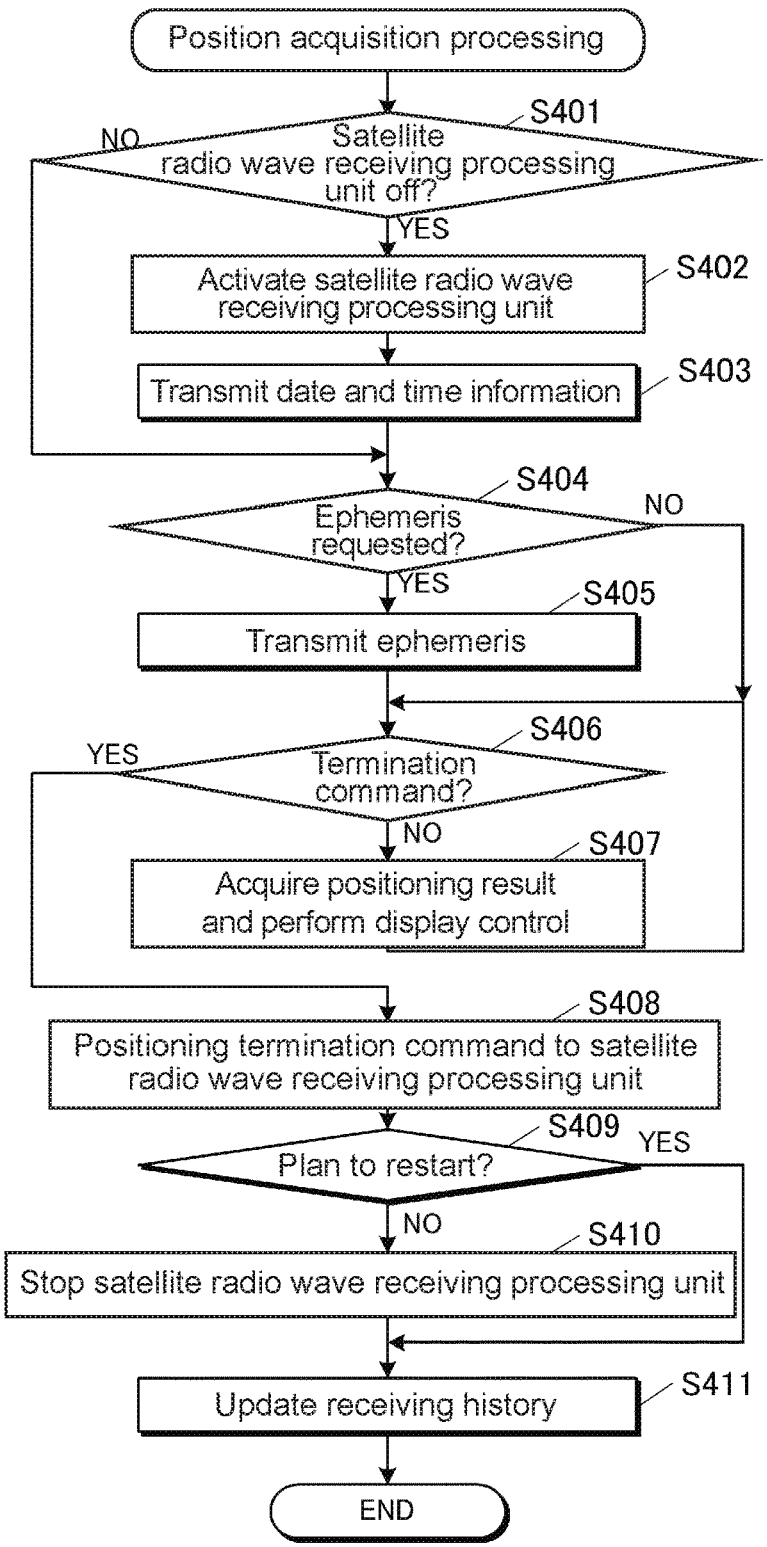
FIG. 4 is a flowchart showing a control procedure for position acquisition processing executed by an electronic timepiece of Embodiment 1.

FIG. 4 is a flowchart showing a control procedure carried out by the host CPU 41 for position acquisition processing executed by the electronic timepiece 1 of the present embodiment. This position acquisition processing is started based on a user operation, or is periodically invoked and executed at prescribed time intervals on the basis of a setting operation by a user, or the like.

When the position acquisition processing is started, the host CPU 41 determines whether or not a power supply to the satellite radio wave receiving processing unit 60 has been stopped (is off) (step S401). In a case where it is determined that the power supply has not been stopped ("no" in step S401), the processing carried out by the host CPU 41 transitions to step S404.

In a case where it is determined that the power supply has been stopped ("yes" in step S401), the host CPU 41 activates the satellite radio wave receiving processing unit 60 by causing power to be supplied from the power supply unit 50 to the satellite radio wave receiving processing unit 60 (step S402). The host CPU 41 transmits information regarding the date and time being counted to the satellite radio wave receiving processing unit 60 (step S403). Thereafter, the processing carried out by the host CPU 41 transitions to step S404.

Upon transitioning from the processing of steps S401 and S403 to the processing of step S404, the host CPU 41 determines whether or not there has been a request for ephemeris data from the satellite radio wave receiving processing unit 60 (step S404). In a case where it is determined that there has been a request ("yes" in step S404), the host CPU 41 transmits ephemeris data to the satellite radio wave receiving processing unit 60 (step S405). The ephemeris data to be transmitted may be data regarding all of the positioning satellites, or may be only data of some (assumed to be in a visible state from the most recent positioning position and the current date and time) of the positioning satellites designated from the satellite radio wave receiving processing unit 60. Thereafter, the processing carried out by the host CPU 41 transitions to step S406. In a case where it is determined that there has not been a request for ephemeris data ("no" in step S404), the processing carried out by the host CPU 41 transitions to step S406.

Upon transitioning to the processing of step S406, the host CPU 41 determines whether or not a termination command for the acquisition of position information has been detected (step S406). This termination command includes that which corresponds to a user operation received by the operation receiving unit 49, and that which is automatically set and output in a positioning interruption period during intermittent positioning set by the host CPU 41. In a case where it is determined that a termination command has not been detected ("no" in step S406), the host CPU 41 waits for the input of a positioning result from the satellite radio wave receiving processing unit 60, and acquires an input positioning result and outputs, to the display driver 48, a display control signal for the display 47 that is based on the acquired positioning result (step S407). Furthermore, the host CPU 41 can correct the date and time counted by the timing circuit 46 on the basis of data regarding the current date and time acquired together with the positioning result. Thereafter, the processing carried out by the host CPU 41 returns to step S406.

In a case where it is determined that a termination command has been detected ("yes" in step S406), the host CPU 41 outputs a positioning termination command to the satellite radio wave receiving processing unit 60 (step S408). The host CPU 41 determines whether or not there is a plan for positioning to be executed once again thereafter due to a positioning interruption period or the like in intermittent positioning (step S409). In a case where it is determined that there is a plan ("yes" in step S409), the processing carried out by the host CPU 41 transitions to step S411. In a case where it is determined that there is no plan ("no" in step S409), the host CPU 41 sets the satellite radio wave receiving processing unit 60 to off and suspends the power supply from the power supply unit 50 (step S410). Thereafter, the processing carried out by the host CPU 41 transitions to step S411.

Upon transitioning to the processing of step S411, the host CPU 41 updates and stores receiving history information in the RAM 43 (step S411). The host CPU 41 then terminates the position acquisition processing.

Figure 5:
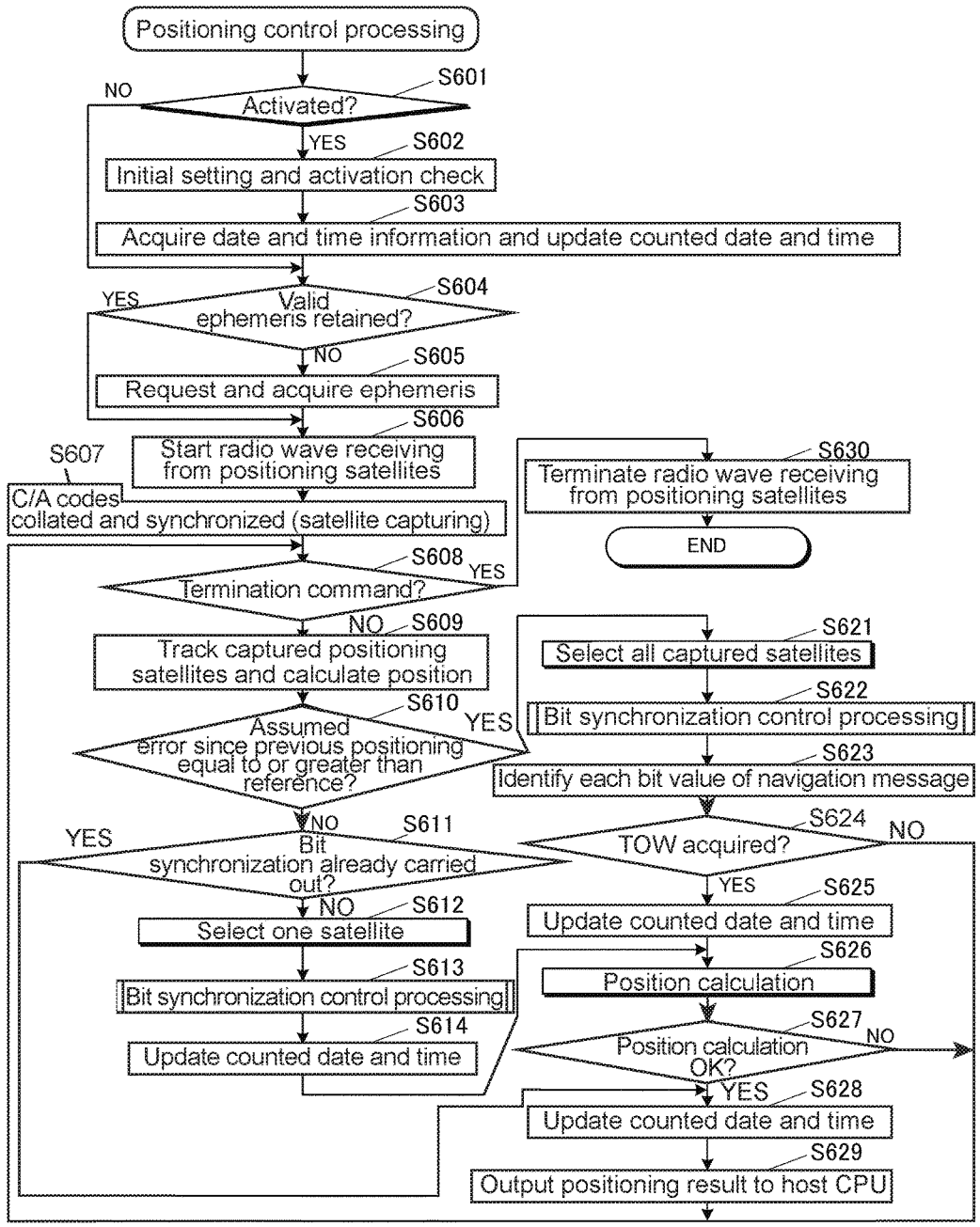
FIG. 5 is a flowchart showing a control procedure for positioning control processing executed by a satellite radio wave receiving processing unit of the electronic timepiece of Embodiment 1.

FIG. 5 is a flowchart showing a control procedure carried out by the module CPU 645 for positioning control processing executed by the satellite radio wave receiving processing unit 60.

This positioning control processing includes an embodiment for date and time correction processing of the present invention, and is started according to an activation command or an execution command from the host CPU 41.

Upon the positioning control processing being started, the module CPU 645 determines whether or not the satellite radio wave receiving processing unit 60 has been activated and the present processing control has been started (step S601). In a case where it is determined that the satellite radio wave receiving processing unit 60 has not been activated (the satellite radio wave receiving processing unit 60 itself has already been activated) ("no" in step S601), the processing carried out by the module CPU 645 transitions to step S604. In a case where it is determined that the satellite radio wave receiving processing unit 60 has been activated and the present processing control has been started (in other words, restarted after having been interrupted for an indefinite period due to termination of the previous positioning) ("yes" in step S601), the module CPU 645 carries out initial settings for the satellite radio wave receiving processing unit 60 and an initial check when activated (step S602). The module CPU 645 acquires date and time information (information pertaining to the current date and time) transmitted from the host CPU 41, and updates the counted date and time and starts counting the date and time (step S603). Thereafter, the processing carried out by the module CPU 645 transitions to step S604.

Upon transitioning to the processing of step S604, the module CPU 645 determines whether or not an ephemeris from within a valid period pertaining to a positioning satellite assumed to be in a visible state at the current date and time (counted date and time) is retained (step S604). The determination of a visible state, for example, may be carried out according to whether the angle of elevation of a positioning satellite seen from the current position is equal to or greater than a prescribed reference angle, and so forth, and consideration may not be given to actual geographical undulations, building structures, or the like. In a case where it is determined that an ephemeris is retained ("yes" in step S604), the processing carried out by the module CPU 645 transitions to step S606. In a case where it is determined that a valid ephemeris is not retained ("no" in step S604), the module CPU 645 requests the host CPU 41 for ephemeris data, and stores acquired ephemeris data in the storage unit 646 (step S605). Thereafter, the processing carried out by the module CPU 645 transitions to step S606.

Upon transitioning to the processing of step S606, the module CPU 645 causes operation of the RF unit 63, the capturing unit 641 of the baseband unit 64, and the like to start, and starts an operation to receive radio waves from a positioning satellite (step S606). The module CPU 645 captures transmitted radio waves from the positioning satellite by causing the capturing unit 641 to carry out the collation of C/A codes with received radio wave signals (digitally sampled IF signals), and carrying out synchronization (step S607). At such time, the module CPU 645 can set the order of the capturing operation in such a way that a positioning satellite that is assumed to have been captured is preferentially set as a capture target, on the basis of the retained ephemeris and the previous positioning result (current position).

The module CPU 645 determines whether or not a positioning operation termination command has been input from the host CPU 41 (step S608). In a case where it is determined that a positioning operation termination command has been input ("yes" in step S608), the module CPU 645 causes operation of the RF unit 63 and the tracking unit 642 to stop, and terminates the operation to receive radio waves from the positioning satellite (step S630). The module CPU 645 then terminates the positioning control processing.

In a case where it is determined that a positioning operation termination command has not been input from the host CPU 41 ("no" in step S608), the module CPU 645 carries out a tracking operation for the captured positioning satellite, and calculates the current position and an accurate current date and time on the basis of a deviation (pseudo-distance) in the receiving timing of a signal from the positioning satellite being tracked and the current date and time being counted (counted date and time) (step S609).

The module CPU 645 determines whether or not an assumed error dTe, which is the largest estimate value for the deviation in the counted date and time (current date and time), is equal to or greater than a reference time dTc, on the basis of the elapsed time since the previous positioning and the date and time counting situation (step S610). Here, information regarding the proportion of deviation (1 ppm) in the TCXO and the proportion of deviation (10 ppm) in the timing circuit 46 is retained in advance, and, for example, the module CPU 645 determines whether or not the assumed error $dTe=10^{-6} Tn+10^{-5} Tf$ is equal to or greater than the reference time $dTc=10^{-2}$ (sec), the assumed error dTe being obtained using an elapsed time Tn (sec) in which the satellite radio wave receiving processing unit 60 has been in an on-state and an elapsed time Tf (sec) in which the satellite radio wave receiving processing unit 60 has been in an off-state (the length of an interruption period in the operation of the module CPU 645) from the previous positioning and correction of the counted date and time having been carried out.

In a case where the assumed error dTe is not equal to or greater than (is less than) the reference time dTc ("no" in step S610), the module CPU 645 determines whether or not bit synchronization has already been carried out in the current positioning control processing (step S611). It can be possible to determine whether or not bit synchronization has been carried out by setting a flag or the like which is reset in an initial state (an unset state) and, in a case where bit synchronization control processing described later on has been successful, is set to a set state.

In a case where it is determined that bit synchronization has not been carried out ("no" in step S611), the module CPU 645 selects one satellite from the captured positioning satellites (one of the transmitted radio waves from the plurality of positioning satellites used for positioning) (step S612), and invokes and executes bit synchronization control processing described later on, for the one positioning satellite (step S613). The module CPU 645 performs an update in which the counted date and time are moved forwards or backwards in the range of ±10 msec in accordance with the decided bit data boundary timing (the transmission time from the positioning satellite is corrected as necessary) (step S614; date and time deviation correction step, date and time deviation correction unit). Thereafter, the processing carried out by the module CPU 645 transitions to step S626. In a case where it is determined that bit synchronization has been carried out ("yes" in step S611), the processing carried out by the module CPU 645 transitions to step S628.

In the determination processing of step S610, in a case where it is determined that the assumed error dTe is equal to or greater than the reference time dTc ("yes" in step S610), the module CPU 645 selects all of the captured positioning satellites as targets for bit synchronization control processing (step S621), and executes respective bit synchronization control processing (step S622). The module CPU 645 carries out an operation to sequentially identify each bit value in demodulated navigation messages received from each positioning satellite for which a bit data boundary timing has been decided (step S623). The module CPU 645 detects a preamble from an array of identified bit values, and additionally acquires the TOW. The module CPU 645 determines whether or not the TOW has been acquired (step S624), and, in a case where it is determined that the TOW has not been acquired ("no" in step S624), processing returns to step S608.

In a case where it is determined that the TOW has been acquired ("yes" in step S624), the module CPU 645 updates the counted date and time on the basis of the TOW acquisition timing and the decrypted content (date and time) of the TOW (step S625). An accurate transmission time of the transmitted radio waves from the positioning satellites is not obtained, and therefore the date and time obtained in this case can include a slight deviation (of the order ±10 to 15 msec at most). Thereafter, the processing carried out by the module CPU 645 transitions to step S626.

Upon transitioning from the processing of steps S614 and S625 to the processing of step S626, the module CPU 645 calculates the current position using the counted date and time that has been updated (step S626; positioning execution step, positioning execution unit). The module CPU 645 determines whether or not the current position has been successfully calculated (step S627). In a case where it is determined that the current position has not been successfully calculated ("no" in step S627), the processing step carried out by the module CPU 645 returns to step S608. In a case where it is determined that the current position has been successfully calculated ("yes" in step S627), the processing carried out by the module CPU 645 transitions to step S628.

Upon transitioning from the processing of steps S611 and S627 to the processing of step S628, the module CPU 645 updates the counted date and time (step S628). The module CPU 645 outputs the positioning result to the host CPU 41 (step S629). Thereafter, the processing carried out by the module CPU 645 returns to step S608. It should be noted that, after having returned to the processing of step S608, the interval in which the positioning operation is carried out is determined as appropriate.

Figure 6:
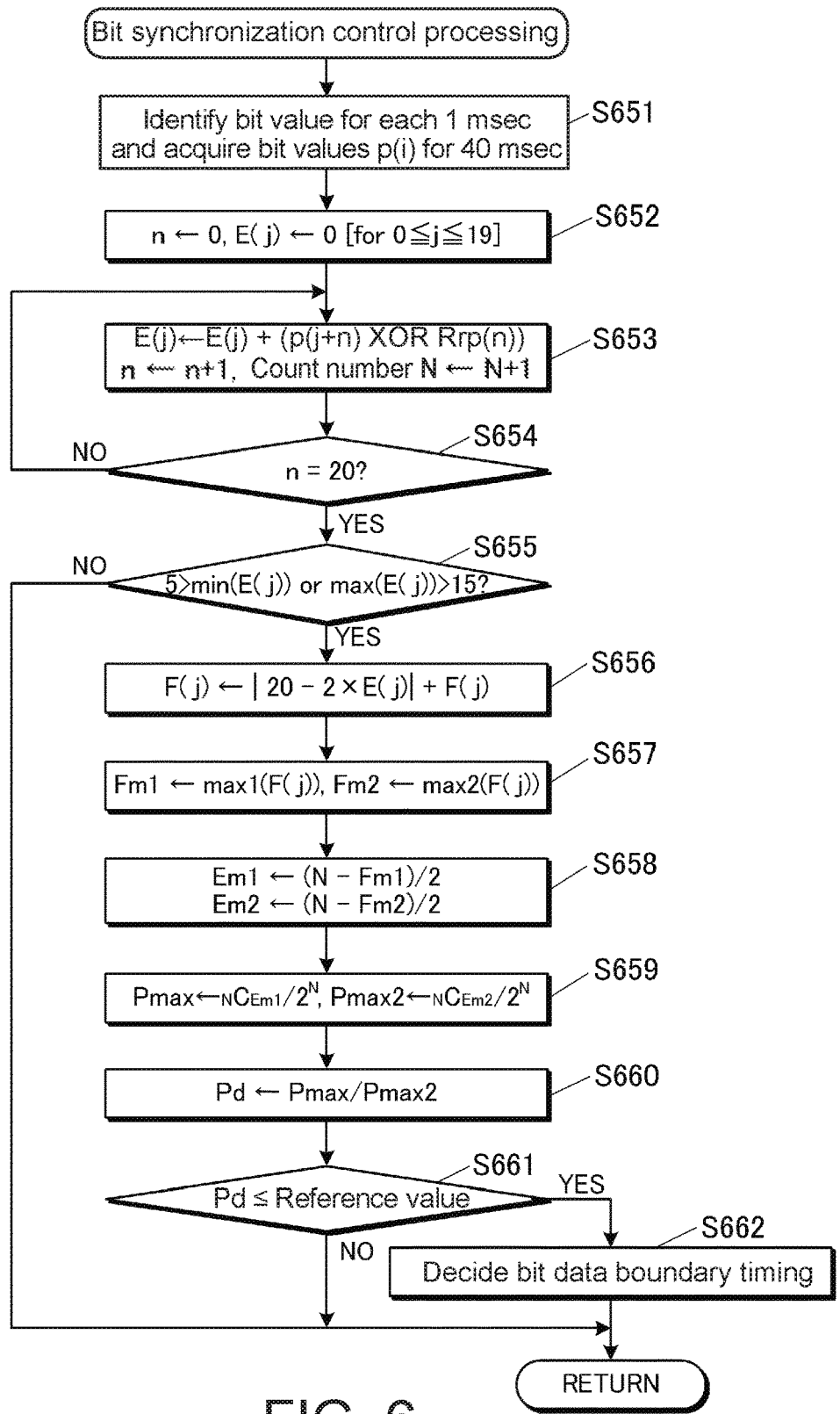
FIG. 6 is a flowchart showing a control procedure for bit synchronization control processing invoked in the positioning control processing.

FIG. 6 is a flowchart showing a control procedure carried out by the module CPU 645 for bit synchronization control processing invoked in the positioning control processing.

When the bit synchronization control processing is invoked, the module CPU 645 divides an acquired input signal at each 1 msec in synchronization with C/A code periods, identifies bit values of the 1 msec periods, and sets the bit values as $i^{th}$ bit value p(i) in an identified bit value array p. The module CPU 645 continuously carries out this processing for 40 msec (i=0 to 39) (step S651; bit value identification step, bit value identification unit).

The module CPU 645 sets a variable n to an initial value "0", and the number of mismatches E(j) that is going to be calculated for each of j bit value arrays (array number j; 0≤j≤19) to "0" as initial values (step S652). The module CPU 645 obtains the exclusive OR between the bit value p(j+n) and the $n^{th}$ bit value Rrp(n) of the comparison bit value array and adds to E(j). The module CPU 645 adds 1 to the variable n, and adds 1 to a count number N (step S653). This way, the initial number of mismatches E(j)

between the reference bit sequence Rrp and the jth bit value array obtained from the acquired input signal is determined for each j.

The module CPU 645 determines whether or not the variable n is 20 (step S654). In a case where it is determined that the variable n is not 20 ("no" in step S654), the processing step carried out by the module CPU 645 returns to step S653. In a case where it is determined that the variable n is 20 ("yes" in step S654), the module CPU 645 determines whether or not the smallest value among the obtained 20 mismatches E(j) (where j=0, 1, 2, . . . , 19) is 5 or less or the largest value is 15 or more (step S655). In a case where it is determined that neither are true ("no" in step S655), the module CPU 645 determines that the bit edge (i.e., a change from 1 to 0 or from 0 to 1) was not in the sampled 40 msec of identified bit values p(j) and terminates the bit synchronization control processing and processing returns to the positioning control processing. At such time, the module CPU 645 does not erase or initialize the values set in the bit synchronization control processing.

In a case where it is determined that the smallest value out of the number of mismatches E(j) is 5 or less or the largest value is 15 or more ("yes" in step S655), the module CPU 645 determines that the bit edge was present in the sampled 40 msec of identified bit values. In the step S656, the "number of matches" that will be used in the subsequent calculations is defined such that if the number of mismatches is "10" or more, the module CPU 645 inverts the number of matches with the number of mismatches and adds the number of matches to an integrated number of matches F(j) (step S656). Specifically, the module CPU 645 adds the number of matches as |20−2×E(j)| to the integrated number of matches F(j) originally determined.

The module CPU 645 takes the largest value max1(F(j)) among the integrated numbers of matches F(j) (where j=0, 1, 2, . . . , 19) as the largest integrated number of matches Fm1, and takes the second largest value max2(F(j)) as the second largest integrated number of matches Fm2 (step S657). In a case where there are two or more of the largest value, the largest integrated number of matches Fm1 and the second largest integrated number of matches Fm2 are the same value. The module CPU 645 converts the largest integrated number of matches Fm1 into a smallest integrated number of mismatches Em1=(N−Fm1)/2, and converts the second largest integrated number of matches Fm2 into a second smallest integrated number of mismatches Em2=(N−Fm2)/2 (step S658). Here, in this and other embodiments below, as described above, N=20. (Note that this N is different from count number N in S653 in this and the other embodiments described below.)

The module CPU 645 calculates Pmax=$_N C_{Em1/2}^N$ and Pmax2=$_N C_{Em2/2}^N$ as occurrence probabilities for the respective array patterns with those identified j's with which mismatching sections at the smallest integrated number of mismatches Em1 and the second smallest integrated number of mismatches Em2 respectively occur (step S659). As shown in these expressions, in this example, the bit error rate c in the identified bits obtained from the radio waves received is assumed to be 0.5. The module CPU 645 calculates a ratio of the occurrence probabilities Pd=Pmax/Pmax2 (step S660). The module CPU 645 determines whether or not the ratio Pd is equal to or less than a prescribed reference value (step S661). In a case where it is determined that the ratio Pd is equal to or less than the reference value ("yes" in step S661), the module CPU 645 decides, as a bit data boundary timing (bit edge), the acquisition timing head of the 11$^{th}$ bit value in the array portion of the particular array number j that generated the smallest number of mismatches E(j) (i.e., the smallest integrated number of mismatches Em1) (step S662). In this case, therefore, the bit edge detection is successfully performed. The module CPU 645 then terminates the bit synchronization control processing, and the processing returns to the positioning control processing. At such time, the module CPU 645 can set a flag pertaining to implementation of the aforementioned bit synchronization. In a case where it is determined that the ratio Pd is not equal to or less than the reference value ("no" in step S661), the module CPU 645 terminates the bit synchronization control processing, and processing returns to the positioning control processing.

A bit edge detection step in the positioning control method of the present embodiment is constituted by the processing of the aforementioned steps S653 and S656 to S662, and a bit edge detection unit in a program pertaining to date and time correction is constituted.

It should be noted that, as mentioned above, the count number N and the integrated number of matches F(j) in the bit synchronization control processing are not reset, and are integrated as necessary. Consequently, in a case where the bit synchronization control processing is invoked in the positioning control processing, it is necessary for the bit synchronization control processing to be carried out in synchronization with the 20 msec period initially set.

As mentioned above, the satellite radio wave receiving processing unit 60 of Embodiment 1 is provided with: the receiver, which includes the RF unit 63, the capturing unit 641, and the tracking unit 642 and receives transmitted radio waves including a navigation message composed of an array of bit data transmitted from a positioning satellite; and the module CPU 645, in which the module CPU 645 identifies bit values of the navigation message in each divided period obtained by dividing the duration (20 msec) of each item of bit data in the navigation message into 20 for each C/A period (1 msec), and acquires an identified bit value array in which the identified bit values are arranged in receiving order, carries out a bit edge detection operation in which a head timing at which bit values switch in the transmitted radio waves received is decided based on a plurality of bit value arrays in the identified bit value array, corrects a deviation in a current date and time being counted (that is counting) that is less than 20 msec, in accordance with an amount of deviation in the decided head timing with respect to the current date and time, and carries out positioning using the corrected current date and time.

In this way, boundaries between items of bit data of the navigation message are detected and very small deviations in the date and time are detected, and very small deviations in the date and time can thereby be corrected easily and promptly. Also, positioning is carried out based on the corrected date and time, and accurate positioning can thereby be executed more quickly and simply. In particular, after carrying out synchronization with C/A codes as normal, the duration of each item of bit data is divided into a plurality of divided periods and bit value switching is detected, and therefore it is not necessary for a large amount of data to be retained and processed at high speed in C/A code chip units in relation to the detection of bit edges.

Furthermore, the module CPU 645 carries out the bit edge detection operation for at least any one of the transmitted radio waves from a plurality of positioning satellites used for the positioning, and carries out the positioning using the current date and time that has been corrected according to the decided head timing. In this way, since the date and time are corrected quickly and simply prior to positioning being carried out, positioning computations are carried out using that current date and time, and the current position can thereby be converged upon more reliably and quickly. Thus, in the satellite radio wave receiving processing unit 60, an accurate current position can be acquired in a precise manner.

Furthermore, the module CPU 645 externally acquires ephemerides of the plurality of positioning satellites, and carries out the positioning using the ephemerides and the corrected current date and time.

Thus, after restarting the receiving of transmitted radio waves from the positioning satellites, positioning is carried out promptly as soon as pseudo-distances are acquired. Also, when initial computations pertaining to this positioning are carried out, it is possible to use a current date and time that is more accurate than in a case where the initial positioning computations are carried out as normal, and thus it is possible to complete the positioning computations with an accurate current position being converged upon more reliably and quickly.

Furthermore, the divided periods have a length (1 msec) corresponding to one period of a C/A code with which the navigation message is spectrum-spread, and are determined respectively in synchronization with each period. Since C/A code phase synchronization is necessary in order to initially capture transmitted radio waves from positioning satellites, and bit edges are synchronized with C/A codes, in this way, by setting divided periods synchronized with C/A code periods, bit edges can be detected quickly and easily.

Furthermore, in the bit edge detection operation of the embedment described above, the module CPU 645 compares and collates the comparison bit value array Rrp, which is composed of an array of 20 bit values and in which the 20 bit values change from "0" to "1" or from 1 to 0 at a boundary position (between the $10^{th}$ bit value and the $11^{th}$ bit value) that is prescribed in advance, with each of array portions that are each composed of 20 consecutive bit values that are obtained from a series of the identified bit value array acquired from the transmitted radio waves received, while shifting the head position of the array portions with respect to the comparison bit value array Rrp one bit value at a time for a number of times corresponding to the duration of one bit value (in other words, 20 bit values corresponding to 20 msec). The module CPU 645 then identifies the array portion that has the largest the number of matches with Rrp or that has the largest number of mismatches, whichever is larger in terms of the number of matches/mismatches, from among the plurality of the array portions so compared, and determines the head timing of the bit data in the transmitted radio waves received, on the basis of a position corresponding to the boundary position of such an identified array portion if the probability of misrecognition for the identified array portion is lower than a prescribed criteria as compared to other array portions.

In this way, a comparison is carried out with the single comparison bit value array Rrp while shifting the head position of a bit value array in the plurality of divided periods when detecting a bit edge, and the smaller out of the number of matches and the number of mismatches is taken as the number of mismatches, and therefore a bit edge can be easily identified with a single processing scheme without giving consideration to the direction of the phase inversion of the bit values. Furthermore, while suppressing the storage capacity for the comparison bit value array Rrp and the identified bit value array to be low, it is sufficient for only the number of matches and the number of mismatches to be stored for each array portion, and therefore a large capacity memory is not required.

Furthermore, the number of entries in the array (prescribed number) in the comparison bit value array Rrp is made to be equal to the number of divided periods (1 msec) within the duration (20 msec) of each item of bit data; therefore, a sufficient number of bits can be compared and collated without duplicating processing. It is thereby possible to appropriately reduce the risks of a bit edge itself not being detected, and the probability precision of a detected bit edge being insufficient and the processing time becoming more prolonged.

Furthermore, the module CPU 645 decides the head timing of the bit data in the transmitted radio waves received, on the basis of a position corresponding to a bit value switching boundary position in the identified array portion (referred to as "first array portion") at which the array portion does not cause misrecognition at a prescribed probability or more with respect to a second array portion, the first array portion corresponding to an array portion having the largest out of the degree of matching and the degree of mismatching, and the second array portion corresponding to an array portion having the second largest out of the degree of matching and the degree of mismatching, with the comparison bit value array Rrp from among the array portions.

In this way, if the probability of misrecognition with the array portion that is second lowest in terms of non-matching is sufficiently low, the probability of misrecognition with other array portions is even lower, and therefore consideration does not need to be given thereto, and it is possible to easily determine whether or not sufficient precision can be obtained with a simple comparison of two candidates.

Furthermore, the module CPU 645, for each of the array portions, determines the smaller out of the number of matches and the number of mismatches obtained by the comparing and collating, as the number of mismatches, and carries out the bit edge detection operation using the array portion for which the number of mismatches is the smallest and the array portion for which the number of mismatches is the second smallest.

In this way, by simply taking the smaller out of the number of matches and the number of mismatches as the number of mismatches, processing can be easily carried out by means of simple processing without considering the code inversion direction. Furthermore, by taking the bit error rate ε as 0.5 as in the present embodiment, mistaking the number of matches for the number of mismatches or vice versa does not cause a problem. Furthermore, even if the bit error rate ε is determined separately, it is not possible to decide a bit edge with sufficiently high precision in a case where mis-identifications of bit values increase as the magnitudes of the number of matches and the number of mismatches invert, and therefore, ultimately, a problem is not caused. Consequently, processing that gives consideration to code inversion can be greatly reduced by means of this kind of processing, and a bit edge can be decided easily and quickly.

Furthermore, the module CPU 645 decides the head timing in a case where the ratio Pd of the probability P1 of detecting the array portion for which the number of mismatches is the smallest with respect to the probability P2 of detecting the array portion for which the number of mismatches is the second smallest is equal to or less than a prescribed reference ratio. In this way, whether or not it is possible to decide a bit edge is determined on the basis of a probability ratio of detection probabilities, and therefore a bit edge is quantitatively determined at a sufficient precision. Furthermore, it is sufficient to calculate only the probability ratio Pd, and computation processing can be simplified in cases such as when the detection probabilities P1 and P2 are obtained according to a binomial distribution.

Furthermore, the module CPU 645 abandons the result of the comparing and collating without deciding the head timing, in a case where the difference between the number of matches and the number of mismatches is equal to or less than a prescribed reference difference (10). Thus, in a case where the radio wave receiving strength (CN ratio) is low, by not carrying out bit edge detection processing from the beginning, the amount of wasteful processing can be reduced.

Furthermore, the result of the comparing and collating is integrated for a plurality of periods repeatedly until the ratio Pd that is equal to or less than the prescribed reference ratio is obtained, in a case where the difference is larger than the reference difference and the ratio Pd is greater than the prescribed reference ratio. As mentioned above, processing in which it is not necessary to consider the number of matches and the number of mismatches is carried out, and therefore, even in a case where the radio wave receiving strength (CN ratio) is low and a bit edge cannot be determined with sufficient precision, it becomes possible to decide a bit edge with increased precision easily and in a short time by integrating comparison and collation results for a plurality of periods.

Furthermore, the module CPU 645 carries out a correction to the current date and time that is less than the duration based on the bit edge detection operation, in a case where it is determined that the deviation in the current date and time is less than a reference time that is equal to or less than the duration (20 msec) of the bit data, on the basis of the elapsed time from positioning having been previously carried out and information retained in advance pertaining to a proportion (rate) of the deviation that may occur in the current date and time being counted.

The proportion of deviation in the counted date and time is determined by an oscillator of the oscillation circuit 65, and the largest amount of deviation in the counted date and time is easily assumed in accordance with the elapsed time from the previous positioning and the rate thereof. Consequently, by carrying out simple date and time correction processing within a range in which it is possible to correct the largest amount of deviation assumed for the counted date and time by only bit edge detection, in other words, in a case where it is possible to uniquely specify bit edges, it is possible to reduce processing in an appropriate range and promptly correct to an accurate date and time while preventing a change to an inaccurate date and time to an even greater extent.

Furthermore, the module CPU 645, in a case where the counted current date and time has been corrected, outputs, to the host CPU 41, date and time information for correcting the current date and time counted by the timing circuit 46 that independently counts the current date and time. In a case where operation of the module CPU 645 has been restarted after having been interrupted, the module CPU 645 acquires information pertaining to the current date and time from the timing circuit 46 via the host CPU 41 and starts counting the current date and time, and determines whether or not the deviation in the current date and time is less than the reference time in accordance with the information pertaining to the proportion (rate) of the deviation that may occur in the date and time counted by the timing circuit 46 and a length of a period of interruption in the operation of the module CPU 645, and carries out a correction to the current date and time that is less than the duration (20 msec) based on the bit edge detection operation.

In a case where operating and stopping are switched intermittently according to positioning operations as with the satellite radio wave receiving processing unit 60, it is necessary to externally acquire the date and time counted by the module CPU 645 when restarting operation; however, by appropriately recognizing timing errors of the timing circuit 46 external to the acquisition destination, and appropriately correcting to the correct date and time in accordance with the operation of the satellite radio wave receiving processing unit 60, it is possible to easily carry out a correction to a deviation in the current date and time based on the bit edge detection operation effectively in a range corresponding to the rate of the timing circuit 46.

Furthermore, the proportion of the deviation in the current date and time that is counted (that counts) during operation of the module CPU 645 is smaller than the proportion of the deviation in the current date and time that is counted by the timing circuit 46. Consequently, in a case where the module CPU 645 is operating even when the receiving of radio waves from positioning satellites pertaining to the positioning operation is not carried out, consideration can be given to the rate of the current date and time that is counted within that period, and a simple correction to the current date and time can be carried out for a longer time period. In particular, in cases such as when positioning is carried out intermittently in short intervals, by turning off the power supply for only the receiver, it becomes possible to improve the efficiency of processing during positioning even more.

Furthermore, the electronic timepiece 1 of the present embodiment is provided with the satellite radio wave receiving processing unit 60; the timing circuit 46 that counts the current date and time; and the display 47 that displays at least the time on the basis of the current date and time counted by the timing circuit 46. Also, the module CPU 645 outputs date and time information for correcting the date and time counted the timing circuit 46 in a case where the date and time information has been corrected, and, in a case where operation of the module CPU 645 has been restarted after having been interrupted, acquires the date and time counted by the timing circuit 46 and starts counting the current date and time.

In this way, in the electronic timepiece 1, the displayed date and time are accurately kept based on radio waves received from positioning satellites, and the date and time are acquired from the timing circuit 46 when operation is restarted while the power supply to the satellite radio wave receiving processing unit 60 is turned off when not required, and it thereby becomes possible for accurate positioning to be carried out reliably and promptly particularly in a case where positioning is repeated at intervals of short periods. An increase in power consumption can thereby be suppressed, and efficient date and time and position acquisition processing can be carried out without requiring the addition of special configurations and complex processing.

Furthermore, the electronic timepiece 1 is provided with the host CPU 41 that causes a positioning result produced by the satellite radio wave receiving processing unit 60 to be implemented by the display 47. In other words, in this electronic timepiece 1, not only the current date and time but also information pertaining to the current position can be comprehended by the user from a display implemented by the display 47.

Furthermore, a positioning control method of the satellite radio wave receiving processing unit 60 of the present embodiment is a positioning control method of the satellite radio wave receiving processing unit 60 provided with a receiver (the RF unit 63, capturing unit 641, and tracking unit 642) that receives transmitted radio waves including a navigation message composed of an array of bit data transmitted from a satellite, the positioning control method including: a bit value identification step (step S651 in the bit synchronization control processing) of identifying bit values of the navigation message in each divided period (1 msec) obtained by dividing a duration (20 msec) of each item of bit data in the navigation message into a plurality, and acquiring an identified bit value array in which the identified bit values are arranged in receiving order; a bit edge detection step (steps S653 and S656 to S662 in the bit synchronization control processing) of carrying out a bit edge detection operation in which a head timing at which bit values switch in the transmitted radio waves received is decided based on a plurality of bit value arrays in the identified bit value array; a date and time deviation correction step (step S614 in the positioning control processing) of correcting a deviation in a current date and time being counted (that is counting) that is less than the duration (20 msec), in accordance with an amount of deviation in the decided head timing with respect to the current date and time; and a positioning execution step (step S626 in the positioning control processing) of carrying out positioning using the corrected current date and time.

By carrying out this kind of date and time correction, a very small deviation in the date and time can be corrected more quickly and simply while suppressing a configuration enlargement and processing increase.

Furthermore, the programs 646a of the present embodiment cause a computer (the module CPU 645) of the satellite radio wave receiving processing unit 60 provided with a receiver (the RF unit 63, capturing unit 641, tracking unit 642) that receives transmitted radio waves including a navigation message composed of an array of bit data transmitted from a satellite to function as: a bit value identification unit (step S651 in the bit synchronization control processing) that identifies bit values of the navigation message in each divided period (each C/A code period) obtained by dividing the duration (20 msec) of each item of bit data in the navigation message into a plurality, and acquires an identified bit value array in which the identified bit values are arranged in receiving order; a bit edge detection unit (steps S653 and S656 to S662 in the bit synchronization control processing) that carries out a bit edge detection operation in which a head timing at which bit values switch in the transmitted radio waves received is decided based on a plurality of bit value arrays in the identified bit value array; a date and time deviation correction unit (step S614 in the positioning control processing) that corrects a deviation in the current date and time being counted (that is counting) that is less than the duration (20 msec), in accordance with an amount of deviation in the decided head timing with respect to the current date and time; and a positioning execution unit (step S626 in the positioning control processing) that carries out positioning using the corrected current date and time.

By installing such programs 646a and carrying out control processing in a software-like manner, a very small deviation in the date and time can be corrected more quickly and simply while suppressing a configuration enlargement and processing increase.

<Embodiment 2>

Next, an electronic timepiece of Embodiment 2 of the present invention will be described.

An electronic timepiece 1 of Embodiment 2 has the same configuration as the electronic timepiece 1 of Embodiment 1, and therefore a description thereof is omitted and the same reference characters are used.

Next, a positioning operation in the electronic timepiece 1 of Embodiment 2 will be described.

In the electronic timepiece 1 of the present embodiment, in a case where a positioning operation based on receiving radio waves from positioning satellites is carried out intermittently, an amount of movement is calculated based on measurement values of sensors 71 while the positioning operation is paused. Information (movement information) pertaining to this amount of movement may be used for the display implemented by the display 47. Here, in a case where the amount of movement has become equal to or greater than a reference distance that is determined in advance, a bit array for a navigation message is identified, current date and time information is acquired, and a pseudo-distance (transmission time of transmitted radio waves) is reacquired. The reference distance is determined as appropriate within a range in which the pseudo-distance does not change equal to or more than a C/A period (or equal to or more than a code period). In a case where the amount of movement based on the measurement values of the sensors 71 is not to be used for display or the like, calculation of the amount of movement after the amount of movement has exceeded the reference distance may be suspended.

Furthermore, in the electronic timepiece 1 of the present embodiment, in a case where bit synchronization is to be carried out, the bit error rate $\varepsilon$ is made to fluctuate based on the receiving situation.

Figure 7:
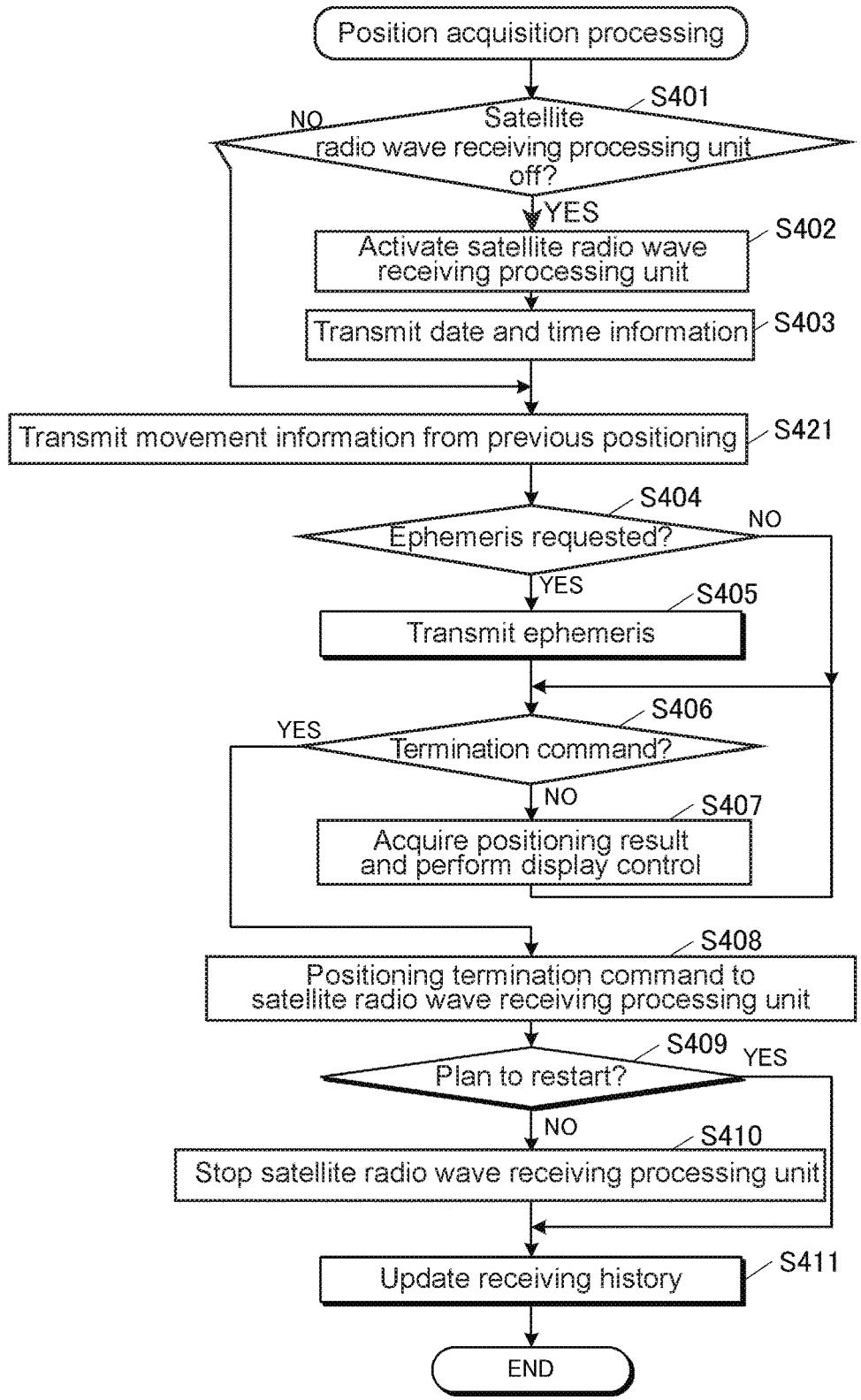
FIG. 7 is a flowchart showing a control procedure for position acquisition processing executed by an electronic timepiece of Embodiment 2.

FIG. 7 is a flowchart showing a control procedure carried out by a host CPU 41 for position acquisition processing executed by the electronic timepiece 1 of the present embodiment.

This position acquisition processing is the same as the position acquisition processing carried out by the electronic timepiece of Embodiment 1 except for the addition of step S421, and processing content that is the same is denoted by the same reference characters and descriptions thereof are omitted.

In a case where it is determined in the processing of step S401 that the satellite radio wave receiving processing unit 60 is not off (step S401), and after date and time information has been received in the processing of step S403, the host CPU 41 transmits movement information from the previous positioning obtained based on measurement results of the sensors 71, to the satellite radio wave receiving processing unit 60 (step S421). Thereafter, the processing carried out by the host CPU 41 transitions to step S404.

Figure 8:
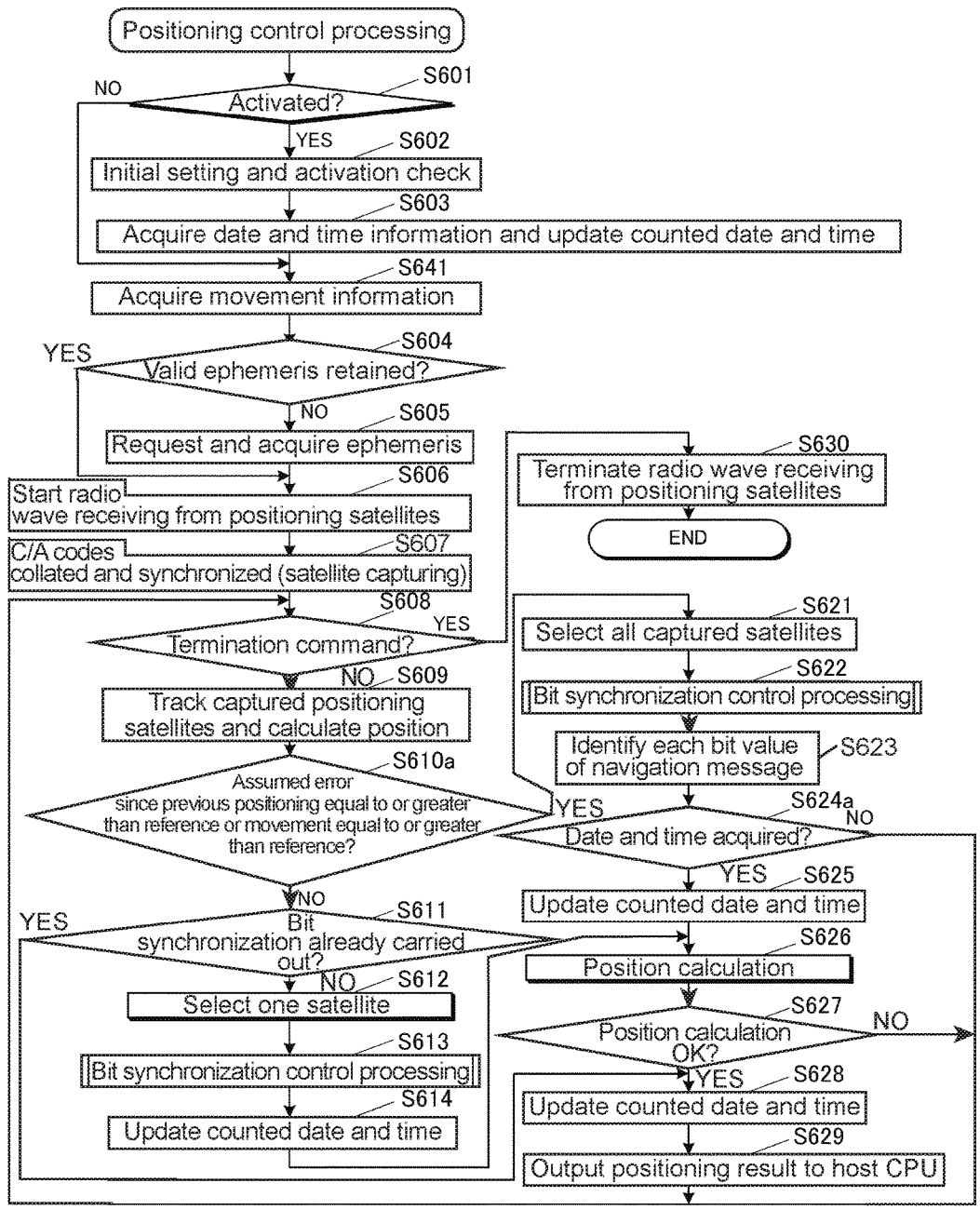
FIG. 8 is a flowchart showing a control procedure for positioning control processing executed by a satellite radio wave receiving processing unit of the electronic timepiece of Embodiment 2.

FIG. 8 is a flowchart showing a control procedure carried out by a module CPU 645 for positioning control processing executed by the satellite radio wave receiving processing unit 60 of the electronic timepiece 1 of the present embodiment.

Compared to the positioning control processing invoked in the position acquisition processing in the electronic timepiece 1 of Embodiment 1, this positioning control processing has the processing of step S641 added thereto and the processing of steps S610 and S624 respectively replaced by the processing of steps S610a and S624a. Other processing is the same between the electronic timepiece 1 of Embodiment 1 and the electronic timepiece 1 of Embodiment 2, and processing content that is the same is denoted by the same reference characters and descriptions thereof are omitted.

In a case where it is determined in the processing of step S601 that the satellite radio wave receiving processing unit 60 has not been activated due to the positioning control processing ("no" in step S601), and after date and time information has been acquired and the timed date and time have been updated in the processing of step S603, the module CPU 645 acquires movement information from the host CPU 41 (step S641). Thereafter, the processing carried out by the module CPU 645 transitions to step S604.

Furthermore, following on from the processing of step S609, the module CPU 645 determines whether or not an assumed error in the counted date and time after the previous positioning is equal to or greater than a reference value, or whether or not the device itself (current position) has moved a prescribed reference distance or more from the timing of the previous positioning and bit synchronization implementation (step S610a). Here, in addition to the movement information acquired in the processing of step S641, it is possible for consideration to also be given to the movement distance during the positioning period in a case where continuous positioning based on transmitted radio waves from positioning satellites is being carried out. In a case where it is determined that either is true ("yes" in step S610a), the processing of the module CPU 645 transitions to step S621, and in a case where it is determined that neither are true (the assumed error is less than the reference value and the amount of movement is less than the prescribed reference distance) ("no" in step S610a), the processing of the module CPU 645 transitions to step S611.

The processing to sequentially identify each bit value of a navigation message received and demodulated in step S623 is progressed, and the module CPU 645 determines whether or not the date and time have been acquired from the bit array (step S624a). This date and time acquisition includes a case where the TOW is directly decrypted as in Embodiment 1, and also cases such as when an error in the counted date and time is within ±3 seconds, for example, and the subframe to which a preamble belongs, in other words, the received date and time of the preamble, is uniquely determined merely by identifying the preamble. In a case where it is determined that the date and time have been acquired ("yes" in step S624a), the processing of the module CPU 645 transitions to step S625, and in a case where it is determined that the date and time have not been acquired ("no" in step S624a), the processing of the module CPU 645 returns to step S608.

Figure 9:
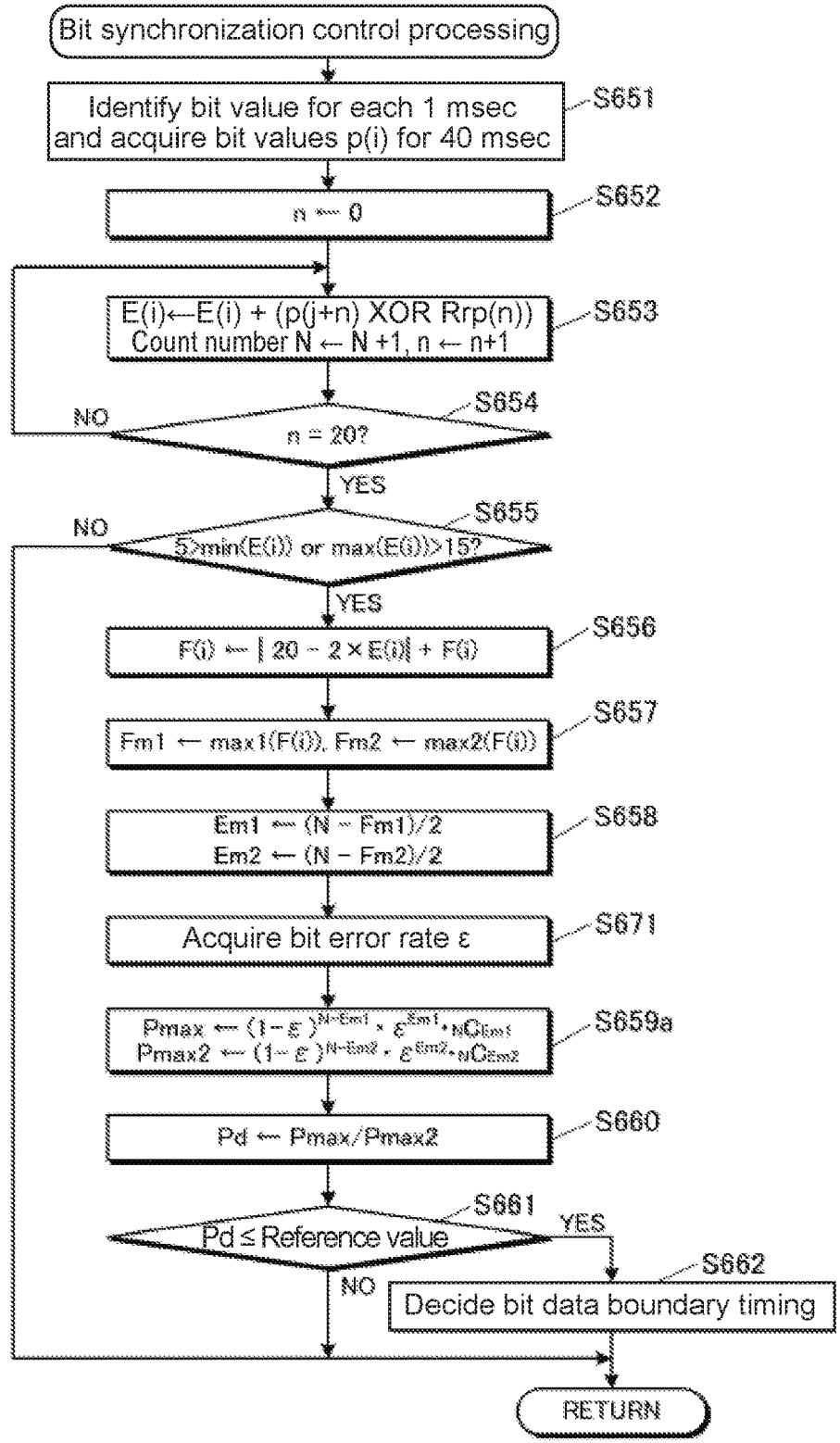
FIG. 9 is a flowchart showing a control procedure for bit synchronization control processing invoked in the positioning control processing carried out by the electronic timepiece of Embodiment 2.

FIG. 9 is a flowchart showing a control procedure carried out by the module CPU 645 for bit synchronization control processing invoked in the positioning control processing carried out by the electronic timepiece 1 of the present embodiment.

This bit synchronization control processing, compared to the bit synchronization control processing invoked in the positioning control processing carried out by the electronic timepiece 1 of Embodiment 1, is different in that the processing of step S671 is added and the processing of step S659 is replaced with the processing of step S659a. Other processing is the same between the electronic timepiece 1 of Embodiment 1 and the electronic timepiece 1 of Embodiment 2, and the same reference characters are used for processing content that is the same and descriptions thereof are omitted.

After the processing of step S658, the module CPU 645 acquires a bit error rate ε corresponding to the receiving situation (step S671). This bit error rate ε is not restricted to a strict actual measured value, and, for example, average correlations between receiving strengths (CN ratios) for received radio waves and bit error rates ε may be stored and retained in the storage unit 646 as table data in advance, and a bit error rate ε may be acquired based on an actual CN ratio. Furthermore, the real-time receiving situation does not necessarily have to be reflected; for example, the bit error rate ε may be decided based on the receiving strength (CN ratio) that was in effect during receiving pertaining to the previous intermittent positioning. Furthermore, as the bit error rate ε, an allowance may be made for rapid and temporary deteriorations or the like in the receiving situation due to being set at a value that is higher than the original value corresponding to a CN ratio.

On the basis of this bit error rate ε, the module CPU 645 calculates a probability Pmax of bit values of a smallest integrated number of mismatches Em1 being misidentified, and a probability Pmax2 of bit values of a second smallest integrated number of mismatches Em2 being misidentified, from among a count number N of bit values (step S659a). In other words, a ratio Pd calculated in step S660 is a lower limit value for the probability of there being a misrecognition between an array of 20 bit values in a period of completely matching a comparison bit value array Rrp and an array of 20 bit values in another period, and it is determined in step S661 whether or not this misrecognition probability is sufficiently small.

As mentioned above, the electronic timepiece 1 of Embodiment 2 is provided with the sensors 71 that measure the operating state of the device itself, and the module CPU 645 carries out a correction to the current date and time that is less than the 1 bit-long duration (20 msec) of a navigation message based on a bit edge detection operation, in a case where the amount of movement from the current position (position of the electronic timepiece 1) obtained by means of the previous positioning is less than a prescribed reference distance.

In this way, whether or not it is possible to correct the date and time by means of only a bit edge detection operation is determined with consideration being given to not only a deviation in the counted date and time but also a change in a transmission time corresponding to a distance change between a positioning satellite and the current position, and it therefore becomes possible to correct the date and time more appropriately and simply and in a shorter time.

<Embodiment 3>

Next, an electronic timepiece of Embodiment 3 will be described.

The configuration of this electronic timepiece 1 of Embodiment 3 is the same as the configuration of the electronic timepiece 1 of Embodiment 1, and the same reference characters are used and descriptions thereof are omitted.

Next, a positioning operation of the electronic timepiece 1 of Embodiment 3 will be described.

The positioning operation in the electronic timepiece 1 of the present embodiment is the same as the positioning operation in the electronic timepiece 1 of Embodiment 1 except for a difference in the control content of the bit synchronization control processing invoked in the positioning control processing controlled by a module CPU 645. In the bit synchronization control processing, in the electronic timepiece 1, a bit edge is decided with consideration being given to combinations of: array portion of bit values for 20 msec (20 bit values) started at each timing (position) of an identified bit value array; and array portions (before and after array portions) of bit values for 20 msec for which the timings are ±1 msec (head positions are ±1 bit value) different with respect to the aforementioned array portion. In a case where all of the bit values have been accurately identified, in the before and after array portions of the array portion that completely matches (or completely mismatches) the comparison bit value array Rrp, the number of matches becomes "1" (or the number of mismatches becomes "1"). Furthermore, in the before and after array portions of an array portion for which the number of matches (or the number of mismatches) is m (1≤m≤19), the numbers of matches are "m±1".

When the j value (i.e., the starting position) of the identified array portion that has the maximum F(j) value is jm, then, the before and after array portions that are shifted by 1 from the identified array portion are represented by the j values of jm+1 and jm−1, respectively, and have the respective number of matches F(jm1±1). In this embodiment, using these values, $|(N-F(jm1\pm1))/2-1|$, which is indicative of the deviation of the values F(jm1±1) from N−1, which is in turn indicative of a deviation from the presumed number of mismatches, 1, is calculated as respective integrated numbers of mismatches Em1n and Em1p. (For the identified array portion having the maximum F(j) value, the integrated number of mismatches Em1c=smallest integrated number of mismatches Em1.) The probability of a misidentification occurring with respect to these three array portions is expressed by the following formula (Formula 1).

$$P\max=(1-\varepsilon)^{(N-Em1c+N-Em1n+N-Em1p)} \cdot \varepsilon^{(Em1c+Em1n+Em1p)} \cdot {}_NC_{Em1c} \cdot {}_NC_{Em1c} \cdot {}_NC_{Em1p}.$$ (Formula 1)

Similar to Embodiment 1, when ε =0.5 is assumed, the following formula (Formula 2) is established.

$$P\max=(\tfrac{1}{2})^{3N} \cdot {}_NC_{Em1c} \cdot {}_NC_{Em1n} \cdot {}_NC_{Em1p}$$ (Formula 2)

Similarly, also when the j value (i.e., the start position) of an array portion having the second largest integrated number of matches F(j) is jm2, the probability of a misidentification occurring is obtained using integrated numbers of mismatches Em2c, Em2n, and Em2p, including the before and after array portions represented by jm2±1 is expressed by the following formula (Formula 3).

$$P\max2=(\tfrac{1}{2})^{3N} \cdot {}_NC_{Em2c} \cdot {}_NC_{Em2n} \cdot {}_NC_{Em2p}$$ (Formula 3)

It should be noted that the array portion at j=19 (in other words, the final 20 bits of the identified bit value array) may be used as an array portion that is 1 msec before the array portion at j=0 (in other words, the initial 20 bits of the identified bit value array), and the array portion at j=0 may be used as an array portion that is 1 msec after the array portion at j=19.

In this embodiment, if the ratio Pd of these misidentification occurrence probabilities Pmax and Pmax2 is sufficiently small, the data receiving start timing (head timing) of the $11^{th}$ bit value in the array portion at the identified array portion with the start position (j=jm1) is determined as a bit edge.

Figure 10:
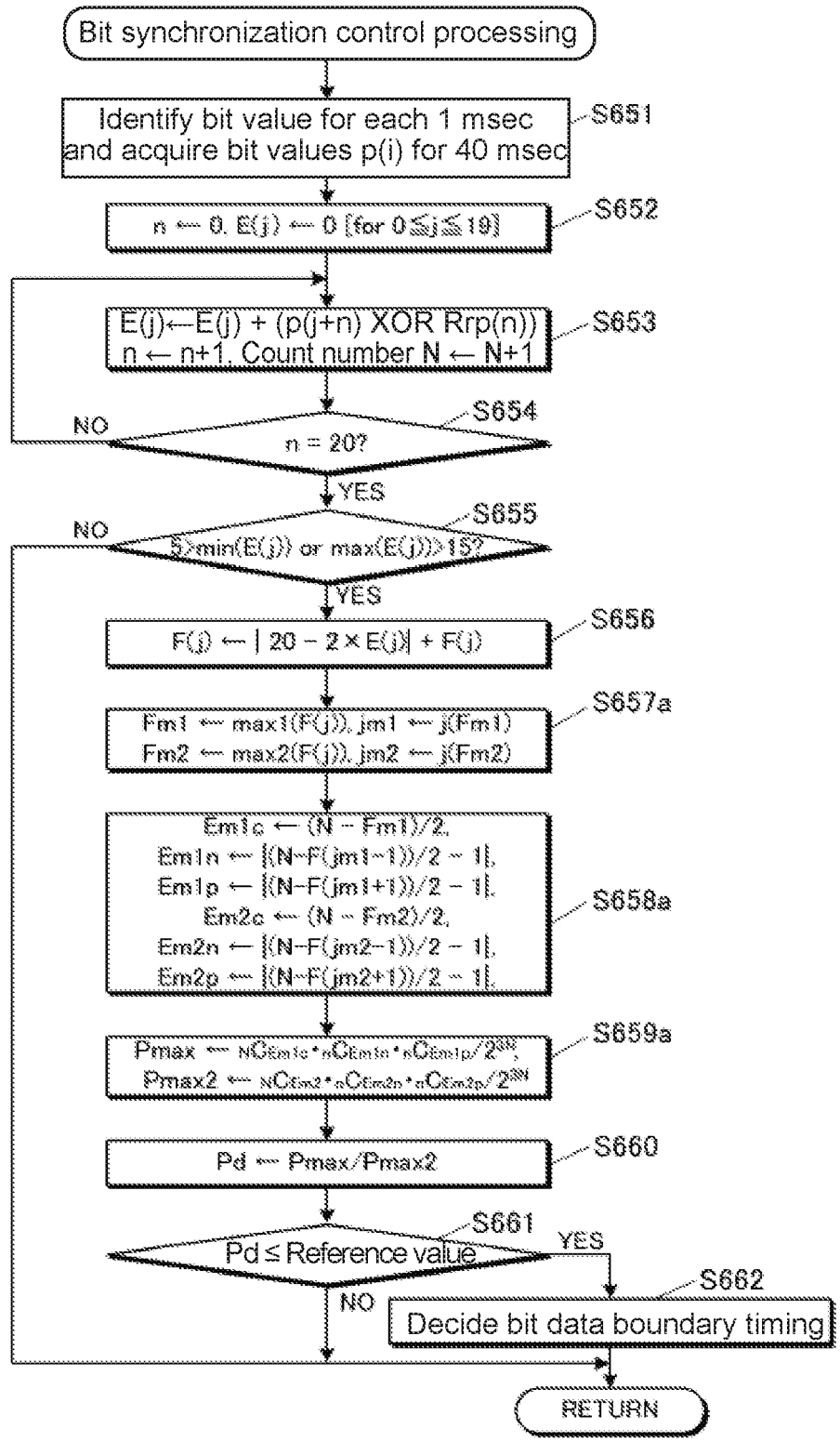
FIG. 10 is a flowchart showing a control procedure for bit synchronization control processing invoked in positioning control processing of an electronic timepiece of Embodiment 3.

FIG. 10 is a flowchart showing a control procedure carried out by the module CPU 645 for bit synchronization control processing invoked in the positioning control processing executed by the electronic timepiece 1 of the present embodiment.

This bit synchronization control processing, compared to the bit synchronization control processing executed by the electronic timepiece 1 of Embodiment 1, is the same except for the processing of steps S657 to S659 being replaced with steps S657a to S659a. The same reference characters are used for processing content that is the same and descriptions thereof are omitted.

Upon the processing of step S656 terminating in the bit synchronization control processing, the module CPU 645 identifies the largest integrated number of matches Fm1 and the second largest integrated number of matches Fm2, and array numbers j that indicate head positions in the identified bit value array for the array portions in which the aforementioned are obtained are respectively taken as a first number jm1 and a second number jm2 (step S657a).

The module CPU 645 converts the largest integrated number of matches Fm1 and the second largest integrated number of matches Fm2 respectively into the smallest integrated number of mismatches Em1 and the second smallest integrated number of mismatches Em2, and takes these respectively as the integrated numbers of misidentifications Em1c and Em2c. Furthermore, the module CPU 645 obtains integrated numbers of misidentifications Em1n, Em1p, Em2n, and Em2p in array portions at timings before and after each of the first number jm1 and the second number jm2 (step S658a).

The module CPU 645 uses the integrated numbers of misidentifications Em1c, Em1n, and Em1p to obtain the misidentification occurrence probability Pmax, and uses the integrated number of misidentifications Em2c, Em2n, and Em2p to obtain the misidentification occurrence probability Pmax2 (step S659a). Thereafter, the processing carried out by the module CPU 645 transitions to step S660.

As mentioned above, in the electronic timepiece 1 of Embodiment 3, the module CPU 645 carries out the bit edge detection operation with consideration being given to the array portions that are shifted by 1 divided unit period (here, 1 msec) before and after from a first array portion having the smallest number of mismatches and a second array portion having the second smallest number of mismatches, respectively. Specifically, the probability of misrecognition is calculated by taking into account the degree of mismatches of these immediately neighboring array portions.

In an array portions for which the head position is shifted by ±1 divided unit period (here, 1 msec) from an array portion that completely matches (or completely mismatches) the comparison bit value array Rrp, the number of mismatch (or match) with the comparison bit value array Rrp is supposed to be always 1, and therefore, by using this characteristic to increase the number of collation bits, the bit edge can be accurately detected in a more reliable manner. Especially, it becomes possible to detect the bit edge accurately in a short period of time even in the case that a misidentification (mis-decoding) of one segment (1 msec divided unit segment) has occurred in an array portion that should have completely matched (or completely mismatches) the comparison bit array Rrp.

It should be noted that the present invention is not restricted to the aforementioned embodiments, and various alterations are possible.

For example, in the aforementioned embodiments, the bit values of 40 bits are identified for an identified bit value array to be completely acquired, and then comparison and collation with the comparison bit value array Rrp are carried out while shifting the head 20 bits at a time from the identified bit value array; however, after the bit values of 20 bits have been identified from the head, comparison and collation with the comparison bit value array Rrp may be carried out in parallel while further extending the identified bit value array. Furthermore, bits that are already no longer used as array portions at bit values that are near the head within the identified bit value array may be erased before the comparison and collation among all of the array portions and the comparison bit value array Rrp have terminated.

Furthermore, the order in which the 20 types of array portions are generated is not particularly restricted, and comparisons with the comparison bit value array Rrp may be carried out sequentially from the rear.

Furthermore, in the aforementioned embodiments, array portions were compared and collated with respect to the one comparison bit value array Rrp while being shifted from the identified bit value array; however, it is possible to similarly decide a bit switching position by comparing and collating a single 20-bit identified bit value array with a plurality of identified bit value arrays having different bit boundary positions. Alternatively, probabilistic processing may not be carried out, and only a switching position (such as a position where switching has occurred the highest number of times in a plurality of periods in a case where there is a misidentification) may be specified in a simple manner.

Furthermore, in the divided periods in which bit values are identified, bit values may be identified in half period units (each 0.5 msec) rather than in C/A code period units. In this case, processing may be restricted in such a way that bit edges do not occur between the first half side and the latter half side of a C/A code.

Furthermore, 20 bit values were compared and collated with the comparison bit value array Rrp in accordance with the length (20 msec) of the bit data; however, bit edges can be appropriately detected even if the number of bits that are compared is less than the aforementioned. However, it is necessary for the number of bits to be equal to or greater than the minimum number of bits corresponding to the precision at which misrecognitions are probabilistically excluded, and closer to 20 bits (large number of bits) is more preferable. Furthermore, the bit value switching position in the comparison bit value array Rrp is not restricted to the center. A matching array portion can be detected even if the switching position is shifted slightly. Furthermore, the bit values on either side may be "0".

Furthermore, a 40-bit identified bit value array was acquired and 20 types of array portions were obtained while shifting the head position one at a time; however, the end and the head of a 20-bit identified bit value array may be connected and an array portion may be obtained with the bit that is subsequent to the end bit serving as the head bit.

Furthermore, in the aforementioned embodiments, a description was given in which the two array portions of the largest and second largest integrated number of matches F(j) were simply selectable; however, in a case where there are a plurality of array portions having the second largest integrated number of matches F(j), consideration may be given to the positional relationship or the like between the array portions having the largest and second largest integrated number of matches F(j). Furthermore, a mode may be implemented in which, first, comparison and collation results for each array portion are used as indicated in Embodiment 1 and Embodiment 2, and, in a case where sufficient precision is not obtained, additional consideration may be given to the before and after array portions as indicated in Embodiment 3.

Furthermore, in the aforementioned embodiments, the operation of the module CPU 645 was not interrupted in the case of intermittent positioning; however, the operation may be interrupted, or whether or not there is an interruption may be switched according to positioning intervals.

Furthermore, in the aforementioned embodiments, any one positioning satellite was selected in a case where bit synchronization is to be carried out; however, in a case where there is a positioning satellite that may be moving 1 msec or more due to the movement of the positioning satellite, bit synchronization may be carried out at the same time also for that positioning satellite.

The counted date and time can be corrected based on bit synchronization carried out for any one positioning satellite.

Furthermore, in the aforementioned embodiments, it was possible for an ephemeris to be acquired from an external device; however, the present invention can be suitably used in cases such as when positioning is repeated in short time intervals even if it is not possible for an ephemeris to be acquired from an external device.

Furthermore, in the flowcharts indicated in the aforementioned embodiments, upon a bit edge having been decided once, while positioning is being carried out continuously, time elapses and the current position moves and slight corrections to the date and time and corrections to the pseudo-distance are carried out only within C/A code periods until it becomes necessary to acquire a TOW; however, a bit edge can be re-identified with regard to a positioning satellite in a case where the pseudo-distance changes across C/A code periods due to movement in the current position or positioning satellite or the like even in a case where the aforementioned continuous positioning is continued.

Furthermore, in the aforementioned embodiments, as an example, a description was given regarding the transmission format of a navigation message in a case where transmitted radio waves from a positioning satellite such as GPS and Michibiki (Quasi-Zenith Satellite System of Japan) that complements the GPS are received; however, the present invention can be applied also to GLONASS of Russia or the like. In GLONASS, in an L1-band standard precision signal (SP), a navigation message generated at 100 bps (10-msec long) is spectrum-spread at 1-msec periods by means of 511-Kbps PRN codes (511 chips that are 1-μsec long). Consequently, in this case, by comparing and collating an identified bit value array in which 10 bit values are arranged at each 1 msec in synchronization with a PRN code, and a 10 bit-long comparison bit value array in which the first five and the latter five bit values are different, a bit edge is detected in a manner similar to the aforementioned embodiments. In a case where the number of comparisons is not sufficient, precision can be improved with comparisons for two periods being integrated and consideration being given to before and after array portions as in Embodiment 3.

Furthermore, in the aforementioned embodiments, the satellite radio wave receiving processing unit 60 provided in the electronic timepiece 1 was described as an example of a satellite radio wave receiving device; however, a satellite radio wave receiving device is not restricted to being housed within the electronic timepiece 1, and may be mounted in various types of electronic devices in which the main function is not that of a timepiece, such as a positioning device or a navigation device, for example.

Furthermore, positioning results do not necessarily have to be displayable by the electronic timepiece 1, and may be used as information for setting the local time, and may able to be displayed in detail only by an external device with only history being retained.

Furthermore, in the above description, the storage unit 646 having various types of nonvolatile memories such as a flash memory and EEPROM was described as an example of a computer-readable medium for the programs 646a for operation processing of the positioning control processing including bit synchronization control processing pertaining to a processing operation of a module CPU 645 according to the present invention; however, there is no restriction thereto. It is possible for an HDD (hard disk drive) and a portable storage medium such as a CD-ROM or DVD disc to be applied as another computer-readable medium. Furthermore, a carrier wave may also be applied in the present invention as a medium for providing program data pertaining to the present invention via a communication line.

Furthermore, the content of the various processing indicated in each embodiment can be arbitrarily combined and carried out provided that they do not contradict or cancel out the effects of each other.

In addition, specific particulars such as configurations, control content, and procedures indicated in the aforementioned embodiments may be altered as appropriate within a range that does not deviate from the gist of the present invention.

Several embodiments of the present invention have been described; however, the scope of the present invention is not restricted to the aforementioned embodiments, and includes the scope of the invention described in the patent claims and the scope of the equivalent thereof.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A satellite radio wave receiving device comprising:
a receiver that receives radio waves transmitted from a satellite, the radio waves including a message signal having a sequence of bit data with each bit being assigned with a prescribed duration; and
one or more processors,
wherein the one or more processors perform the following:
processing the radio waves received by the receiver to identify a bit value in each of divided unit time segments that are obtained by dividing a time period that has a same duration as said prescribed duration into a plurality of unit time segments of equal duration;
creating a bit array having the identified bit values in the respective divided unit time segments by sequentially arranging the identified bit values in an order of receipt, the one or more processors creating said bit array in a plurality by successively shifting a time at which the bit array starts by one unit time segment;
performing a bit edge detection operation by detecting a head timing of the bit data at which a bit value changes in the received radio waves based on said plurality of bit arrays;
correcting a deviation within said prescribed duration in a current date and time that is counted internally in the satellite radio wave receiving device in accordance with the detected head timing; and
performing positioning by calculating a position of the satellite radio wave receiving device using the corrected current date and time.

2. The satellite radio wave receiving device according to claim 1,
wherein the one or more processors carry out the bit edge detection operation for at least one of the transmitted radio waves from a plurality of positioning satellites used for the positioning, and carry out the positioning using the current date and time that has been corrected according to the detected head timing.

3. The satellite radio wave receiving device according to claim 2,
wherein the one or more processors externally acquire position information of the plurality of positioning satellites, and carry out the positioning using the position information and the corrected current date and time.

4. The satellite radio wave receiving device according to claim 1,
wherein the divided unit time segments each have a length of one period of a pseudo noise code with which the message signal is spectrum-spread, and are set respectively in synchronization with respective periods of the pseudo noise code.

5. The satellite radio wave receiving device according to claim 2,
wherein the divided unit time segments each have a length of one period of a pseudo-noise code with which the message signal is spectrum-spread, and are set respectively in synchronization with respective periods of the pseudo noise code.

6. The satellite radio wave receiving device according to claim 1,
wherein the one or more processors, in the bit edge detection operation, perform the following:
comparing each of said plurality of bit arrays with a prescribed comparison bit array for every unit time segment to determine, among the plurality of bit arrays, a first bit array that has a largest degree of matching or a largest degree of mismatching with the prescribed comparison bit array, said prescribed comparison bit array being a predetermined sequence of bits having a duration of a plural number of the unit time segments, and having a bit boundary in a middle of the sequence at which a bit value changes from 0 to 1 or from 1 to 0; and
determining a position of the bit boundary of said determined first bit array as corresponding to the head timing at which the bit value changes in the received radio waves.

7. The satellite radio wave receiving device according to claim 6,
wherein the duration of said prescribed comparison bit array is set to be equal to said prescribed duration in which each bit lasts in the sequence of the bit data in the message signal.

8. The satellite radio wave receiving device according to claim 6,
wherein the one or more processors, in the bit edge detection operation, further perform the following:
when comparing each of said plurality of bit arrays with the prescribed comparison bit array, also determining, among the plurality of bit arrays, a second bit array that has a second largest degree of matching or a second largest degree of mismatching with the prescribed comparison bit array;
evaluating a probability of erroneously determining the first bit array relative to a probability of erroneously determining the second bit array so as to determine whether to trust the determination of the first bit array; and
when the first bit array is determined to be trusted, determining the position of the bit boundary of said determined first bit array as corresponding to the head timing at which the bit value changes in the received radio waves.

9. The satellite radio wave receiving device according to claim 8,
wherein in comparing each of said plurality of bit arrays with the prescribed comparison bit array to determine the first and second bit arrays, the one or more processors regard a smaller out of a degree of matching and a degree of mismatching as a redefined degree of mismatching, determine a bit array that has a smallest value in the redefined degree of mismatching as the first bit array, and determine a bit array that has a second smallest value in the redefined degree of mismatching as the second bit array in executing the bit edge detection operation.

10. The satellite radio wave receiving device according to claim 9,
wherein in evaluating the probability of erroneously determining the first bit array relative to the probability of erroneously determining the second bit array, the one or more processors calculate a ratio of the probability of erroneously determining the first bit array to the probability of erroneously determining the second bit array, and when said ratio is less than or equal to a prescribed value, the one or more processors determine that the first bit array is trusted.

11. The satellite radio wave receiving device according to claim 10,
wherein when comparing each of said plurality of bit arrays with the prescribed comparison bit array, the one or more processors further evaluate whether a difference between the degree of matching and the degree of mismatching is equal to or less than a prescribed reference difference, and when the difference between the degree of matching and the degree of mismatching is equal to or less than the prescribed reference difference, disregard results of the comparing each of said plurality of bit arrays with the prescribed comparison bit array, and do not perform the bit edge detection operation, and
wherein when the bit edge detection operation is being performed and when said ratio of the probability of erroneously determining the first bit array to the probability of erroneously determining the second bit array is greater than the prescribed value, the one or more processors determine that the first bit array is not trusted and cause said plurality of bit arrays to be renewed.

12. The satellite radio wave receiving device according to claim 8,
wherein in evaluating the probability of erroneously determining the first bit array relative to the probability of erroneously determining the second bit array, the one or more processors evaluate a degree of mismatching in bit arrays that are shifted from the first bit array by a prescribed number of the unit time segments with respect to the prescribed comparison bit array, and a degree of mismatching in bit arrays that are shifted from the second bit array by a prescribed number of the unit time segments with respect to the prescribed comparison bit array.

13. The satellite radio wave receiving device according to claim 1,
wherein the one or more processors estimate an amount of a deviation in the current date and time in accordance with elapsed time from a previously performed positioning and information stored in advance that represents a deviation rate of the current date and time, and
wherein when the estimated amount of the deviation in the current date and time is less a prescribed time limit that is equal to or less than the prescribed duration, the one or more processors perform the bit edge detection operation to correct the deviation within said prescribed duration in the current date and time.

14. The satellite radio wave receiving device according to claim 13,
wherein the one or more processors further perform the following:
when the counted current date and time has been corrected, outputting date and time information for correcting a current date and time counted by an external counter that independently counts a current date and time;
when the one or more processors have been restarted after having been interrupted, acquiring the current date and time as counted by the external counter and starting counting the current date and time; and
estimating the deviation in the current date and time and determining whether the estimated deviation is less than the prescribed time limit in accordance with information indicating a deviation rate of a date and time counted by the external counter and a length of a period of interruption in the operation of the one or more processors, and correcting the deviation in the current date and time that is less than the prescribed duration based on the bit edge detection operation.

15. The satellite radio wave receiving device according to claim 14,
wherein the deviation rate in the current date and time that is counted during operation of the one or more processors is smaller than the deviation rate in the current date and time that is counted by the external counter.

16. The satellite radio wave receiving device according to claim 1, further comprising a sensor that measures a movement of the satellite radio wave receiving device,
wherein the one or more processors determine an amount of movement of the satellite radio wave receiving device from a previous position that was obtained by a previous positioning based on the movement measured by the sensor and determine whether said determined amount of movement is less than a prescribed reference distance, and
wherein when said determined amount of movement is less than the prescribed reference distance, the one or more processors correct the deviation in the current date and time that is less than the prescribed duration based on the bit edge detection operation.

17. An electronic timepiece comprising:
the satellite radio wave receiving device according to claim 1;
a counter that counts a current date and time; and
a display that displays at least a time in accordance with the current date and time counted by the counter,
wherein the one or more processors output date and time information for correcting a date and time counted by the counter when the current date and time information has been corrected, and, when operation of the one or more processors has been restarted after having been interrupted, acquire the date and time counted by the counter and starts counting the current date and time.

18. The electronic timepiece according to claim 17, further comprising a display processor that causes a positioning result produced by the satellite radio wave receiving device to display on the display.

19. A positioning control method of a satellite radio wave receiving device that comprises: a receiver that receives transmitted radio waves transmitted from a satellite, the radio waves including a message signal having a sequence of bit data with each bit being assigned with a prescribed duration; and one or more processors, the method being performed by said one or more processors and comprising:
- processing the radio waves received by the receiver to identify a bit value in each of divided unit time segments that are obtained by dividing a time period that has a same duration as said prescribed duration into a plurality of unit time segments of equal duration;
- creating a bit array having the identified bit values in the respective divided unit time segments by sequentially arranging the identified bit values in an order of receipt, the one or more processors creating said bit array in a plurality by successively shifting a time at which the bit array starts by one unit time segment;
- performing a bit edge detection operation by detecting a head timing of the bit data at which a bit value changes in the received radio waves based on said plurality of bit arrays;
- correcting a deviation within said prescribed duration in a current date and time that is counted internally in the satellite radio wave receiving device in accordance with the detected head timing; and
- performing positioning by calculating a position of the satellite radio wave receiving device using the corrected current date and time.

20. A non-transitory computer-readable storage medium having stored thereon a program that causes one or more processors in a satellite radio wave receiving device that comprises a receiver that receives transmitted radio waves transmitted from a satellite, the radio waves including a message signal having a sequence of bit data with each bit being assigned with a prescribed duration; and said one or more processors to perform the following:
- processing the radio waves received by the receiver to identify a bit value in each of divided unit time segments that are obtained by dividing a time period that has a same duration as said prescribed duration into a plurality of unit time segments of equal duration;
- creating a bit array having the identified bit values in the respective divided unit time segments by sequentially arranging the identified bit values in an order of receipt, the one or more processors creating said bit array in a plurality by successively shifting a time at which the bit array starts by one unit time segment;
- performing a bit edge detection operation by detecting a head timing of the bit data at which a bit value changes in the received radio waves based on said plurality of bit arrays;
- correcting a deviation within said prescribed duration in a current date and time that is counted internally in the satellite radio wave receiving device in accordance with the detected head timing; and
- performing positioning by calculating a position of the satellite radio wave receiving device using the corrected current date and time.

\* \* \* \* \*